United States Patent [19]

Tejima et al.

[11] Patent Number: 5,442,413
[45] Date of Patent: Aug. 15, 1995

[54] PUPIL CONJUGATE-COUPLING DEVICE IN PROJECTING OPTICAL SYSTEM

[75] Inventors: Yasuyuki Tejima; Yasunori Izawa; Nobutaka Minefuji; Ryota Ogawa, all of Tokyo, Japan

[73] Assignee: Asahi Kogaku Kogyo Kabushiki Kaisha, Tokyo, Japan

[21] Appl. No.: 153,876

[22] Filed: Nov. 17, 1993

[30] Foreign Application Priority Data

| | | |
|---|---|---|
| Nov. 26, 1992 [JP] | Japan | 4-316977 |
| Dec. 4, 1992 [JP] | Japan | 4-325200 |
| Jan. 14, 1993 [JP] | Japan | 5-004450 |
| Jan. 14, 1993 [JP] | Japan | 5-004451 |
| Oct. 27, 1993 [JP] | Japan | 5-268871 |

[51] Int. Cl.$^6$ ............................................. G03B 21/14
[52] U.S. Cl. ........................................ 353/69; 353/70
[58] Field of Search ................ 353/69, 70, 38, 101; 359/209, 210, 211, 212, 213

[56] References Cited

U.S. PATENT DOCUMENTS

| | | | |
|---|---|---|---|
| 3,253,505 | 5/1966 | Miller | 353/70 |
| 4,089,599 | 5/1978 | Kuboshima | 353/70 |
| 4,436,392 | 3/1984 | Vanderwerf | 353/70 |
| 5,032,022 | 7/1991 | Sato et al. | 353/69 |
| 5,220,363 | 6/1993 | Sato et al. | 353/70 |
| 5,274,406 | 12/1993 | Tejima et al. | 353/70 |
| 5,302,983 | 4/1994 | Sato et al. | 353/69 |

*Primary Examiner*—William A. Cuchlinski, Jr.
*Assistant Examiner*—William C. Dowling
*Attorney, Agent, or Firm*—Kane, Dalsimer, Sullivan, Kurucz, Levy, Eisele and Richard

[57] ABSTRACT

A pupil conjugate-coupling device in a projecting optical system includes a first projection lens system which forms an intermediate image of an image indicating element, a second projection lens system which projects the intermediate image onto a screen, said first and second projection lens systems having optical axes intersecting at a predetermined angle, and an optical element having structural periodicity positioned between the first and second projection lens systems. The optical element has a positive power and a prism function for deflecting a bundle of rays transmitted through the first projection lens system towards the optical axis of the second projection lens system to thereby couple pupils of the first and second projection lens systems. The optical element is deviated from an intermediate image forming position by a predetermined offset in the optical axis direction thereof.

39 Claims, 23 Drawing Sheets

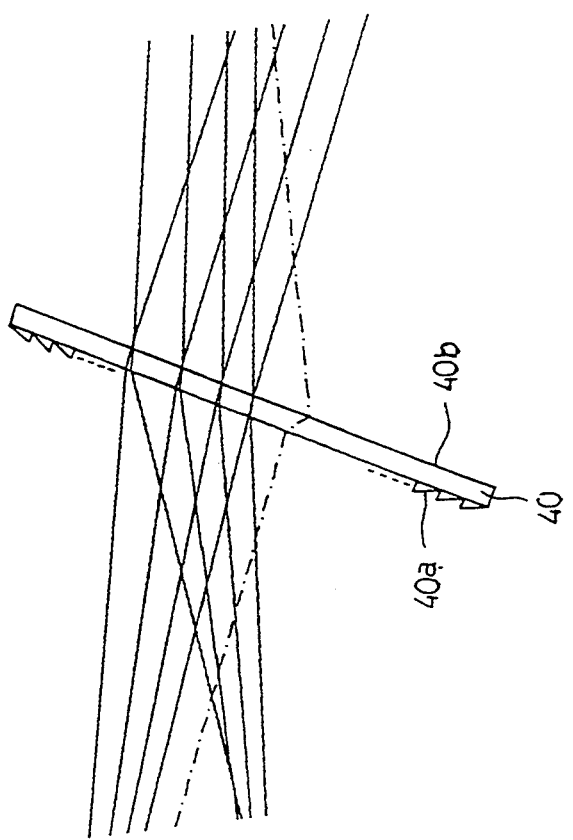

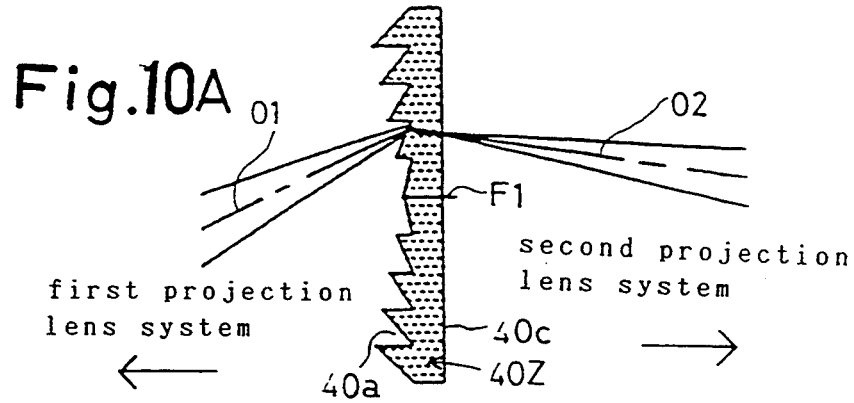
Fig.10A
first projection lens system
second projection lens system
O1, O2, F1, 40a, 40c, 40Z
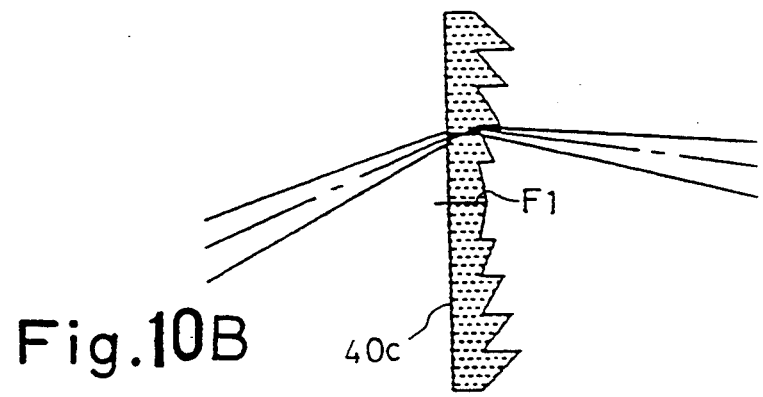
Fig.10B
F1, 40c
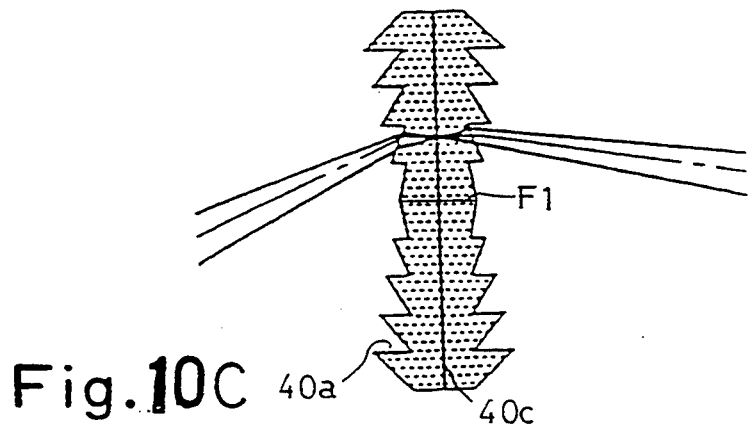
Fig.10C  40a, 40c, F1

PUPIL CONJUGATE-COUPLING DEVICE IN PROJECTING OPTICAL SYSTEM

BACKGROUND OF THE INVENTION

1. Field of the Invention

The present invention relates to a projecting optical system which projects an image indicating element.

2. Description of Related Art

For example, Japanese Unexamined Patent Publication No. 2-79037 discloses a projecting optical system including a first projection lens system which forms an intermediate image of an image indicating element and a second projection lens system which projects the intermediate image onto a screen. The first and second projection lens systems have optical axes intersecting at a predetermined angle. In an optical arrangement disclosed in JPP 2-79037, an extension (i.e., plane) of a surface of an image indicating element of the first projection lens system, a plane passing through a principal point of the first projection lens and perpendicular to the optical axis thereof, and an extension (i.e., plane) of the intermediate image intersect on one straight line. In another arrangement, an extension (i.e., plane) of a screen of the second projection lens system, a plane passing through a principal point of the second projection lens and perpendicular to the optical axis thereof, and an extension (i.e., plane) of the intermediate image intersect on one straight line. With these arrangements, a projecting optical system having no trapezoidal distortion can be realized.

In the projection system proposed in JPP '037, an optical element having a positive power and a prism function is provided at a position in which the intermediate image is formed. The optical element functions as a pupil coupling element to couple pupils of the first and second projecting optical systems. Due to the prism function, the bundle of rays transmitted through the first projection lens system is bent towards the optical axis of the second projection lens system. Due to the positive power, the bundle of rays transmitted through the first projection lens system is converged onto the pupil of the second projection lens system. This allows for the miniaturization of the projection lens of the second projection lens system.

It has been proposed to use a decentered (i.e., eccentric) Fresnel optical element, such as a decentered Fresnel lens or mirror as the positive power optical element having a prism function. However, the decentered Fresnel optical element causes Fresnel fringes which are projected onto the screen, resulting in a dimmed projection image.

If a transmission type screen with a structural periodicity having a lenticular lens and a Fresnel lens is used, a moire effect would be caused by the Fresnel fringes of the decentered Fresnel optical element and the Fresnel fringes of the transmission type screen or fringes of the lenticular lens. Similarly, if the image indicating element is comprised of a liquid crystal panel having pixels in a matrix arrangement, a moire effect would be caused due to the periodicity thereof and the periodicity of the Fresnel optical element. As is well known, the image in the image plane in which the moire effect appears is indistinct.

SUMMARY OF THE INVENTION

The primary object of the present invention is to provide a projecting optical system in which little or no quality deterioration of a projected image occur. Namely, it is an object of the present invention to provide a projecting optical system in which Fresnel fringes of a Fresnel optical element having a positive power and a prism function as a pupil conjugate-coupling element to couple pupils of two projection lens systems is not projected.

Another object of the present invention is to provide a projecting optical system in which no moire effect occurs in an image indicating element and/or an image indicating screen having a structural periodicity.

According to an aspect of the present invention, there is provided a pupil conjugate-coupling device in a projecting optical system comprising a first projection lens system which forms an intermediate image of an image indicating element and a second projection lens system which projects the intermediate image onto a screen. The first and second projection lens systems have optical axes intersecting at a predetermined angle. The device further includes an optical element having a structural periodicity positioned between the first and second projection lens systems. The optical element has a positive power and a prism function to deflect a bundle of rays transmitted through the first projection lens system towards the optical axis of the second projection lens system to thereby couple pupils of the first and second projection lens systems. The optical element is deviated from an intermediate image forming position by a predetermined offset in the optical axis direction thereof.

The deviation of the optical element having a positive power and a prism function from the position of the intermediate image causes the optical element to be in a defocus state with respect to the second projection lens system. Consequently, no Fresnel fringe of the optical element is projected onto the screen. If the optical element is provided with a smooth surface, the first and second projection lens systems are coherently coupled, so that the clear image of the image indicating element can be reproduced onto the screen by the second projection lens system.

A decentered Fresnel lens or a decentered Fresnel mirror can be used as the optical element. In the case of a decentered Fresnel lens, it can be comprised of a plurality of split Fresnel lens elements which are substantially optically equivalent and are located on opposite sides of the intermediate image forming position.

Preferably, at least one aberration compensating lens is provided between the Fresnel lens elements to correct an aberration caused by the Fresnel lens elements. For example, the aberration compensating lens comprises a positive power lens and a negative power lens in combination.

With this arrangement, if the image indicating element and/or the screen has a structural periodicity, a moire effect will not result.

According to another aspect of the present invention, there is provided a pupil conjugate-coupling device in a projecting optical system comprising a first projection lens system which forms an intermediate image of an image indicating element and a second projection lens system which projects the intermediate image onto a screen. The first and second projection lens systems have optical axes intersecting at a predetermined angle. The device further includes a decentered Fresnel optical element having a structural periodicity between the first and second projection lens systems. The optical element has a positive power and a prism function to deflect a bundle of rays transmitted through the first projection lens system towards the optical axis of the second projection lens system to thereby couple pupils of the first and second projection lens systems. A diameter of a circle of confusion of the intermediate image on the decentered Fresnel optical element is larger than a Fresnel pitch of the decentered Fresnel optical element.

According to still another aspect of the present invention, a pupil conjugate-coupling device in a projecting optical system comprises a first projection lens system which forms an intermediate image of an image indicating element and a second projection lens system which projects the intermediate image onto a screen. The first and second projection lens systems have optical axes intersecting at a predetermined angle. The device further includes an optical element having a structural periodicity between the first and second projection lens systems. The optical has a positive power and a prism function to deflect a bundle of rays transmitted through the first projection lens system towards the optical axis of the second projection lens system to thereby couple pupils of the first and second projection lens systems. The optical element having a structural periodicity is comprised of a diffusive optical element.

The diffusive optical element with a structural periodicity and having a positive power and a prism function can be realized for example by a decentered Fresnel lens. The diffusibility of the optical element can be provided by coating the surface thereof with a diffusion layer or by making the entire optical element out of a diffusion material. In the latter case, the decentered Fresnel lens can be made of resin, such as acrylic resin containing a diffusing agent mixed therewith in a press formation.

In the case that the diffusive decentered Fresnel lens is used, no Fresnel surface thereof next to the first projection lens system can be viewed from the side of the second projection lens system due to the diffusibility thereof. The diameter of the bundle of rays on the Fresnel surface of the decentered Fresnel lens next to the second projection lens system (i.e., the diameter of the circle of confusion) is larger than that in case of the absence of the diffusion surface, owing to the diffusion function of the diffusion surface, and accordingly, the moire effect caused by the interference of the intermediate image and the Fresnel fringes is not conspicuous. Furthermore, the emission angle of the bundle of rays is larger when there is a diffusion surface than when there is no diffusion surface. This corresponds to a decrease of the F number of the second projection lens system (i.e., increase of the brightness). Namely, the depth of focus is decreased. Consequently, if the second projection lens system is in focus with respect to the intermediate image on the diffusion surface, the Fresnel surface is out of focus. Thus, a Fresnel fringe of the decentered Fresnel lens itself is not projected or a moire fringe (i.e., the bands which appear in the moire effect), which would be otherwise caused by the interference of the Fresnel fringes with the image of the LCD panel, is not projected onto the screen.

Preferably, if the decentered Fresnel lens is entirely made of a diffusion material, the intermediate image is formed within the diffusive optical element.

It is also possible to provide the diffusion surface on the other surface of the decentered Fresnel lens opposite to the Fresnel surface thereof. In this alternative, the intermediate image is formed on the diffusion surface.

As can be seen from the foregoing, since the image forming surface on which the intermediate image is formed is constituted by the diffusion surface, i.e., the optically rough surface, the Fresnel surface is closer to the image forming surface, so that little or no image can be influenced by an aberration caused by the Fresnel surface.

According to yet another aspect of the present invention, there is provided a pupil conjugate-coupling device in a projecting optical system comprising a first projection lens system which forms an intermediate image of an image indicating element and a second projection lens system which projects the intermediate image onto a screen. The first and second projection lens systems have optical axes intersecting at a predetermined angle. The device further includes an optical element having a structural periodicity between the first and second projection lens systems. The optical element has a positive power and a prism function to deflect a bundle of rays transmitted through the first projection lens system towards the optical axis of the second projection lens system to thereby couple pupils of the first and second projection lens systems. Further included is an optical element oscillating mechanism for oscillating the optical element of cyclic structure in a direction intersecting the optical axis.

When the optical element of structural periodicity having a positive power and a prism function is oscillated by the oscillating means at a predetermined amplitude and cycle (frequency), even if (the image of) the periodic structure is projected onto the screen, the image is inconspicuous. The amplitude and the cycle of the oscillation are determined taking the resolving power of human eyes into account. Namely, when the oscillation takes place, the decentered Fresnel lens is deviated from the reference position (origin position) thereof. Accordingly, the amplitude is determined in view of an acceptable degree of deterioration of the optical properties caused by the deviation. Generally speaking, since the pictures are projected at 48 cycles and 60 cycles (50 cycles in Europe) in the movies and televisions, respectively, the cycle of the oscillation is for example more than 30 cycles.

According to still another aspect of the present invention, a pupil conjugate-coupling device in a projecting optical system comprises a first projection lens system which forms an intermediate image of an image indicating element and a second projection lens system which projects the intermediate image onto a screen. The first and second projection lens systems have optical axes intersecting at a predetermined angle. The device further includes an optical element having a structural periodicity positioned between the first and second projection lens systems. The optical element has a positive power and a prism function to deflect a bundle of rays transmitted through the first projection lens system towards the optical axis of the second projection lens system to thereby couple pupils of the first and second projection lens systems. Further included is an optical element rotating means for rotating the optical element of cyclic structure, so that the cyclic structure of the optical element changes on concentric circles of the optical element having a center located on a center of rotation thereof.

When the optical element is rotated, the effect of the structural periodicity of the optical element thereof changes along the concentric circles whose center is located on the center thereof. An image of the periodic structure cannot be seen by a viewer since the position of the image thereof projected onto the screen continuously changes during the rotation. In other words, the degree of change in the periodic structure in the circumferential direction and the rotational speed are determined, taking into account the resolving power of human eyes, such that an image of the periodic structure does not appear on the screen.

Preferably, the optical element having a structural periodicity is comprised of a decentered Fresnel lens or a mirror having a group of concentric prisms. The center of rotation of the optical element is offset from the center of the Fresnel fringes.

Alternatively, the optical element having a structural periodicity can be comprised of a decentered Fresnel lens or mirror having a spiral prism continuously extending from the vicinity of the center of rotation thereof.

Moreover, the optical element can be comprised of a decentered Fresnel lens or mirror having a plurality of split sector areas about the center of rotation. The sector areas are provided with prisms having different pitches and/or phases.

If the sector areas have different sizes, the periodic structure of the optical element in the circumferential direction becomes more irregular, which is more desirable.

The optical element which is made of a decentered Fresnel lens or decentered Fresnel mirror is preferably deviated from the position of the intermediate image in the optical axis direction, so that an image of the periodic structure is not conspicuous on the screen.

Provision is also made to an oscillating means for oscillating the optical element in the direction intersecting the optical axis. The oscillation of the optical element causes the image of the periodic structure to be more effectively eliminated on the screen.

According to yet another aspect of the present invention, there is provided a pupil conjugate-coupling device in a projecting optical system comprising a first projection lens system which forms an intermediate image of an image indicating element and a second projection lens system which projects the intermediate image onto a screen. The first and second projection lens systems have optical axes intersecting at a predetermined angle. The device further includes a pupil conjugate-coupling optical element positioned between the first and second projection lens systems. The optical element has a positive power and a prism function to deflect a bundle of rays transmitted through the first projection lens system towards the optical axis of the second projection lens system to thereby couple pupils of the first and second projection lens system. The optical element is comprised of a hologram which is deviated from an intermediate image forming position by a predetermined offset in the optical axis direction thereof.

According to still another aspect of the present invention, there is provided a pupil conjugate-coupling device in a projecting optical system comprising a first projection lens system which forms an intermediate image of an image indicating element and a second projection lens system which projects the intermediate image onto a screen. The first and second projection lens systems have optical axes intersecting at a predetermined angle. The device further includes a pupil conjugate-coupling optical element between the first and second projection lens systems. The optical element has a positive power and a prism function to deflect a bundle of rays transmitted through the first projection lens system towards the optical axis of the second projection lens system to thereby couple pupils of the first and second projection lens systems. The optical element is comprised of a hologram which is positioned at an intermediate image forming position. The optical element is further comprised of a hologram oscillating mechanism for oscillating the hologram in a direction intesecting the optical axis. The amplitude and cycle of the oscillation of the hologram effected by the hologram oscillating mechanism are determined such that an image of the hologram projected onto the screen is made inconspicuous. The cycle of oscillation is prefereably greater than 30 cycles.

In the specification of the present application, the "Fresnel optical element" refers to an optical element having a structural periodicity with a smooth surface. The decentered Fresnel optical element can be constituted by for example a decentered Fresnel lens or a decentered Fresnel mirror, as mentioned above. The decentered Fresnel lens or mirror can be directly prepared or obtained by decentering an ordinary Fresnel lens or mirror.

Preferably, an extension plane of the image indicating element surface of the first projection lens system, a plane passing through a principal point of the projection lens and perpendicular to the optical axis, and an extension plane of the intermediate image intersect on one straight line. Similarly, an extension plane of the screen of the second projection lens system, a plane passing through a principal point of the projection lens and perpendicular to the optical axis, and an extension plane of the intermediate image intersect on one straight line. With this arrangement, there is no trapezoidal distortion unlike the above mentioned JPP '037. Namely, the intermediate image includes the trapezoidal distortion caused by the first projection lens system, but the trapezoidal distortion of the intermediate image is removed by the second projection lens system and does not appear on the screen.

BRIEF DESCRIPTION OF THE DRAWINGS

The invention will be described below in detail with reference to the accompanying drawings, in which;

FIG. 8 is an enlarged view of a decentered Fresnel lens shown in FIG. 7;

FIGS. 10A, 10B and 10C are schematic views of different embodiments of a decentered Fresnel lens which is made of a diffusion material;

DESCRIPTION OF THE PREFERRED EMBODIMENT

The following discussion will be directed to several embodiments of the present invention.

Figure 24:
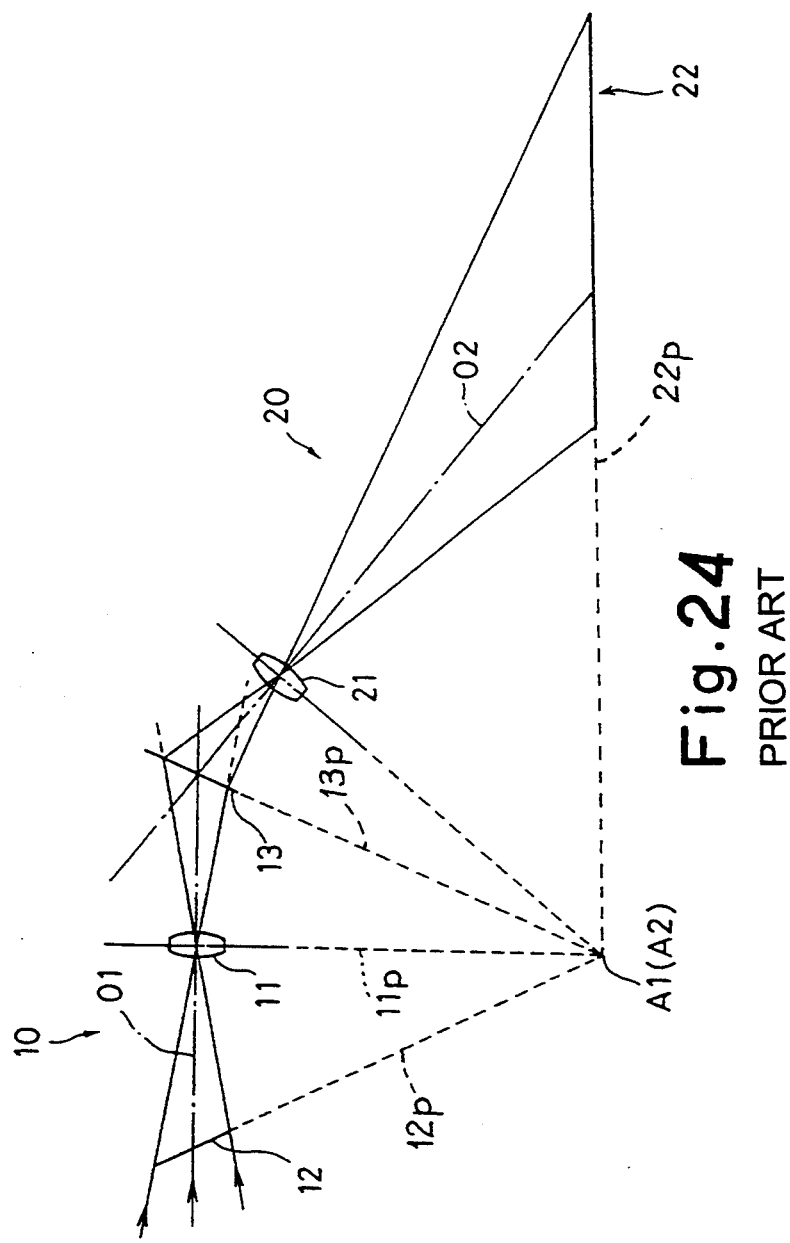
FIG. 24 is a schematic optical connection diagram of a known projecting optical system according to the prior art; and, FIG. 25 is a more detailed schematic optical connection diagram of a known projecting optical system shown in FIG. 24.
Figure 25:
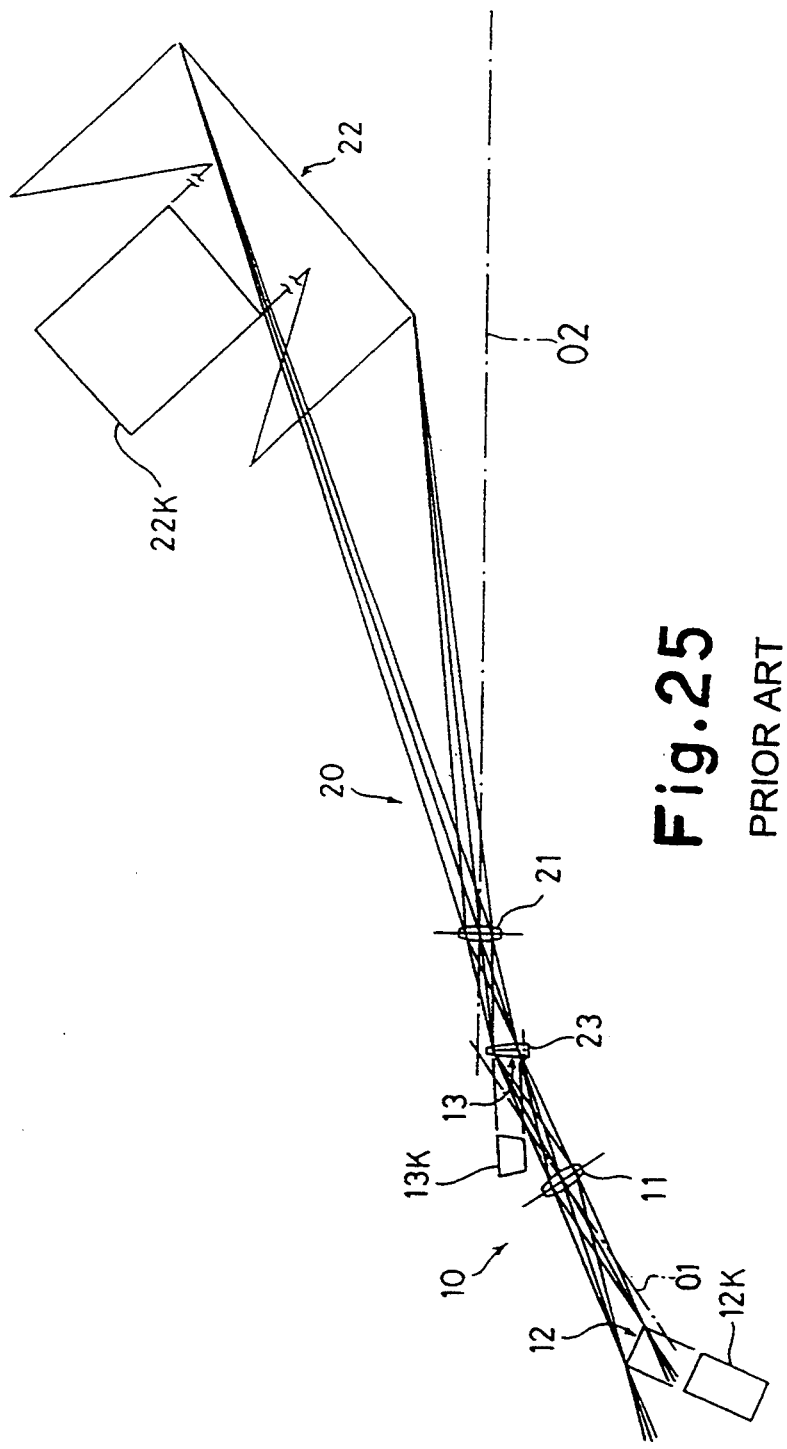

With first reference to FIGS. 24 and 25 which show a known projecting optical system as disclosed in JPP '037, a first projection lens 11 of a first projecting lens system 10 forms an image (intermediate image 13) of a liquid crystal panel (LCD) 12 comprised of pixels in matrix arrangement. A second projection lens 21 of a second projecting lens system 20 projects the intermediate image 13 onto a screen 22.

A plane lip passing through the principal point of the projection lens 11 and perpendicular to the optical axis 01, an extension plane 12P of the LCD 12, and an extension plane 13P of the intermediate image 13 intersect on a straight line A1 extending perpendicularly to the sheet of the drawing. The extension plane 13P, a plane 11P passing through the principal point of the projection lens 21 and perpendicular to the optical axis O2, and an extension plane 22P of the screen 22 intersect on a straight line A2 extending perpendicularly to the sheet of the drawing. In the illustrated embodiment, the lines A1 and A2 are identical, but can be at different positions.

The optical arrangement of the first and second projecting lens systems 10 and 20 mentioned above is based on Scheimpflug's law, so that a clear image of the LCD 12 is formed as an intermediate image 13, and a clear image of the intermediate image 13 is formed on the screen 22. In the first projecting lens system 10, if the shape of the LCD 12 in plan view is rectangular, as indicated at 12K in FIG. 25, the image of the intermediate image 13 is a trapezoidal image 13K having a trapezoidal distortion 13K. The trapezoidal image 13k is corrected by the second projecting lens system 20, so that a projection image 22K having no trapezoidal distortion is formed on the screen 22.

Since the optical axes O1 and O2 of the first and second projecting lens systems 10 and 20 intersect at a predetermined angle, it is necessary to provide an optical element having a positive power and a prism function at a position in which the intermediate image 13 is formed to couple the pupils of the first and second projecting lens systems 10 and 20. In FIG. 25, a decentered lens 23 is used as a pupil conjugate-coupling element. In the theory of optics, it is preferable that the decentered lens 23 is located at the position of the intermediate image 13.

To deflect the bundle of rays at a large angle by means of the decentered lens 23, the latter must have a small radius of curvature and a large center thickness so as to provide a sufficient thickness at the edge portion thereof. This unacceptably increases the size of the decentered lens to be used. To prevent this, it is theoretically possible to use a decentered Fresnel lens instead of the large decentered lens 23. However, if the decentered Fresnel lens is used, the Fresnel fringes are projected onto the screen 22 together with the projection image 22K which is consequently dimmed, as mentioned above. In particular, if the LCD 12 and/or the screen 22 have periodic structures, the cycle of the LCD 12 and/or the screen 22 would interfere with the cycle of the Fresnel lens, so that a moire fringe might be produced within the projection image 22K, thus resulting in a deterioration of the image quality.

FIGS. 1 through 5 show several embodiments of a projecting optical system according to a first aspect of the present invention. In the first aspect, the present invention is applied to a triplet type color liquid crystal projector. Three colors of image light R, G and B by the LCD 12 of the first projection lens system 10 and LCD's (not shown) provided on opposite sides of the dichroic mirror 14 in a direction perpendicular to the sheet of the drawings are combined by the dichroic mirror 14 and are then incident upon the projection lens 11. The second projecting lens system 20 is represented by the projection lens 21 in FIGS. 1 through 5.

Figure 1:
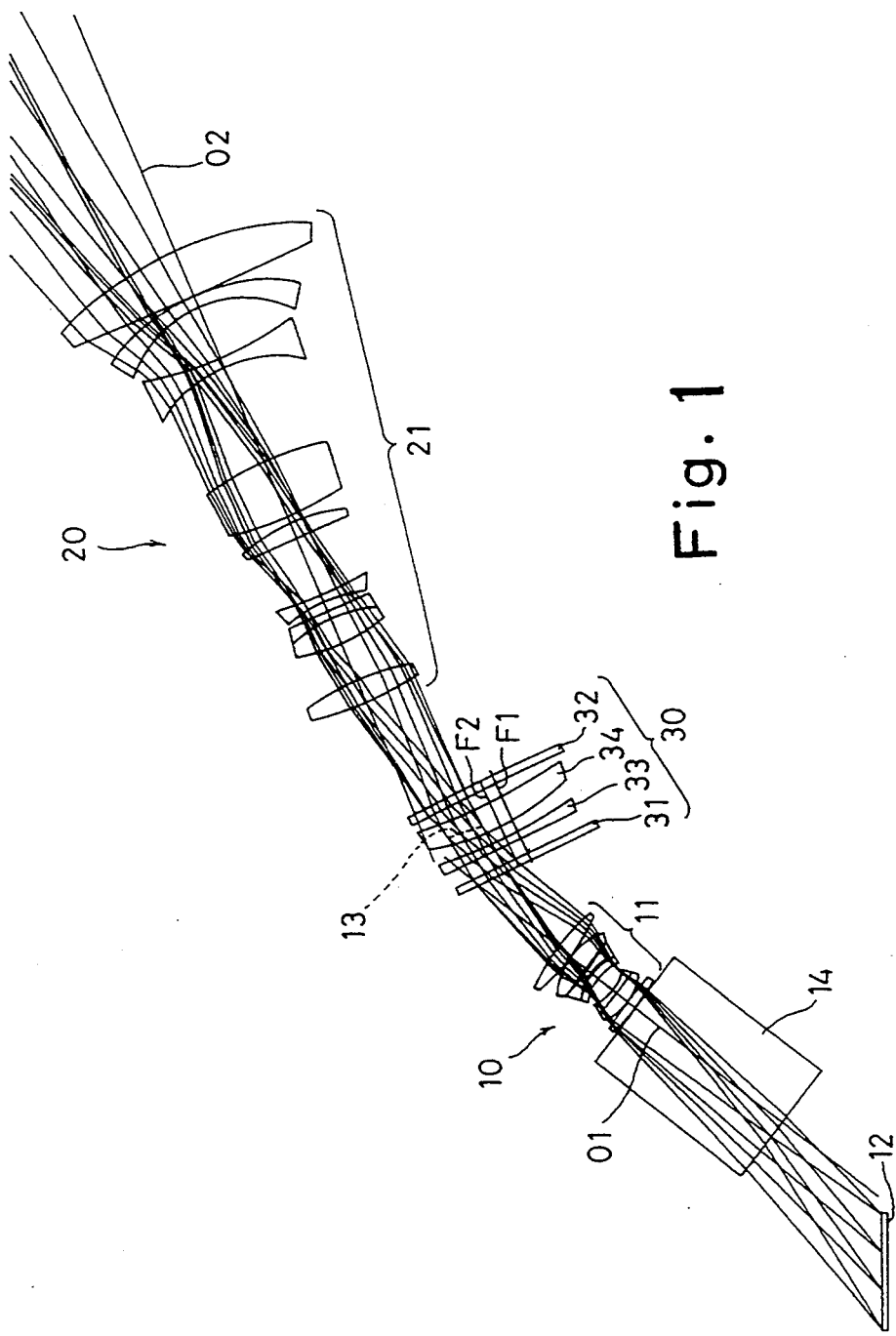
FIG. 1 is a schematic optical connection diagram of an embodiment of a projecting optical system according to a first aspect of the present invention.

A pupil conjugate-coupling element (device) 30 which couples the pupils of the first and second projection lens systems 10 and 20 according to the present invention is comprised of two decentered Fresnel lenses 31 and 32 and two compensating lenses 33 and 34 provided between the two decentered Fresnel lenses in the embodiment shown in FIG. 1. The resultant prism function and positive power of the decentered Fresnel lenses 31 and 32 and the compensating lenses 33 and 34 are substantially equivalent to those of the decentered lens 23 shown in FIG. 25. The center axis F1 of the decentered Fresnel lenses 31 and 32 is offset from the center axis F2 of the compensating lenses 33 and 34. The decentered Fresnel lenses 31 and 32 are located on opposite sides of the intermediate image 13 which is formed within the compensating lens 34.

Thanks to the prism function by the decentered Fresnel lenses 31 and 32, the bundle of rays emitted from the first projection lens system 10 is bent to be made incident upon the second projection lens system 20. The positive power of the coupler 30 contributes to a miniaturization of the projection lens 21 of the second projection lens system 20 due to the convergence function thereof.

In the optical arrangement shown in FIG. 1, in which the decentered Fresnel lenses 31 and 32 are deviated from the position of the intermediate image 13, the Fresnel fringes of the decentered Fresnel lenses 31 and 32 are out of focus (defocus) for the projection lens 21 of the second projection lens system 20, so that no image of the Fresnel fringes is formed within the projection image 22K. Furthermore, a moire effect is not caused by the LCD 12.

The compensating lenses 33 and 34 are inserted between the decentered Fresnel lenses 31 and 32 to absorb various aberrations which are caused by the deviation of the decentered Fresnel lenses from the position of the intermediate image 13. In the illustrated embodiment, the compensating lenses 33 and 34 have negative power and positive power, respectively. It is also possible to absorb various aberrations of the whole optical system including the first and second projection lens systems 10 and 20 by the compensating lenses 33 and 34. If the compensating lenses 33 and 34 are arranged such that the intermediate image 13 is formed on either the lens surface of the compensating lens 33 or the lens surface of the compensating lens 34, no aberration by the surface occurs. Similarly, if the compensating lenses 33 and 34 are arranged such that no intermediate image 13 is formed on the lens surface of the compensating lens 33 or 34, foreign matter applied to the lens surface, such as dust or a crack or flaw on the lens surface is inconspicuous.

In the optical arrangement in which the decentered Fresnel lenses 31 and 32 are deviated from the position of the intermediate image 13, the image of the intermediate image 13 formed on the screen 22 is in focus owing to the projection lenses 11 and 21 and the compensating lenses 33 and 34. Namely, the periodic structure of the LCD 12 is reproduced on the screen 22.

Figure 2:
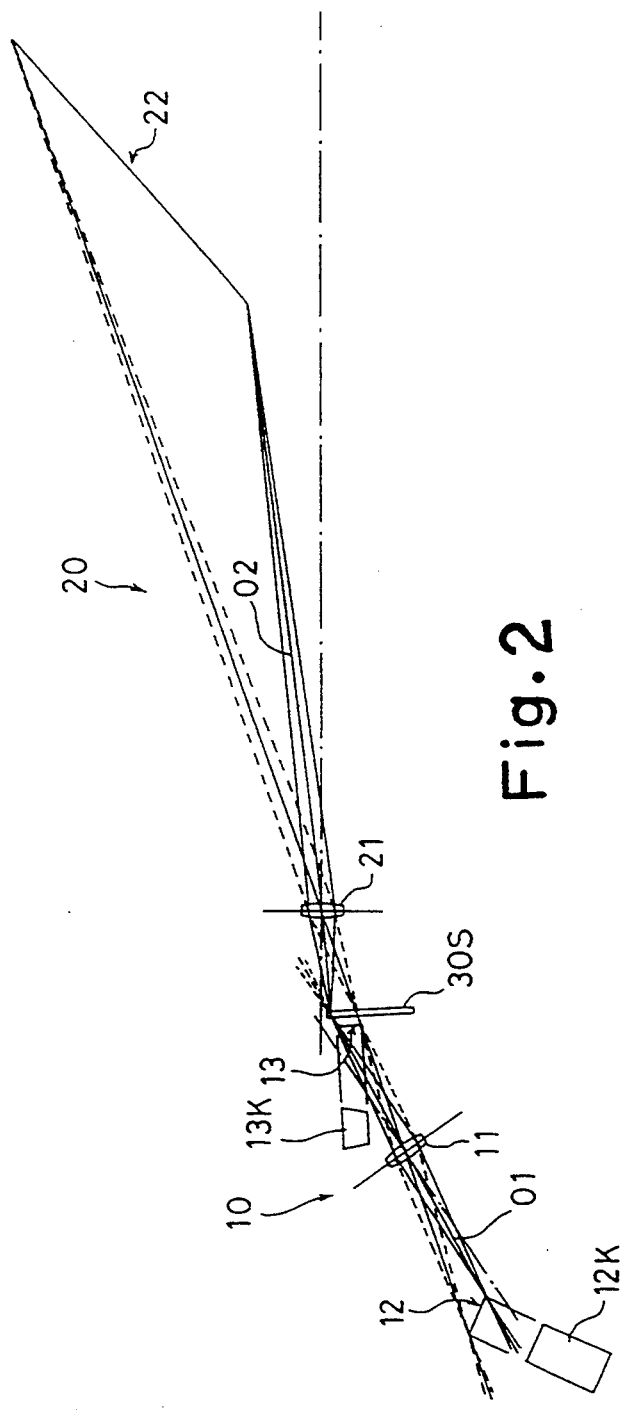
FIG. 2 is a schematic optical connection diagram of another embodiment of a projecting optical system according to a first aspect of the present invention.

FIG. 2 shows another embodiment of the present invention, in which a decentered Fresnel lens 30S having a structural periodicity with a smooth surface within each circular portion is provided such that the diameter of a circle of confusion of the intermediate image 13 on the decentered Fresnel lens 30S is larger than the Fresnel pitch (i.e., periodic pitch) of the Fresnel lens 30S.

In the arrangement shown in FIG. 2, the decentered Fresnel lens 30S is deviated forward from the position of the intermediate image 13 in the optical axis direction to be in a defocus-state (i.e., out of focus), that is, the diameter of the circle of confusion of the intermediate image 13 on the decentered Fresnel lens 30S is larger than the Fresnel pitch (i.e., periodic pitch) of the Fresnel lens 30S. Thus, the periodic structure of the decentered Fresnel lens 30S is reproduced on the screen 22, but the periodic structure of the pixels of the LCD 12 can be reproduced. This is because when the periodic structure of the decentered Fresnel lens 30S consists of a smooth surface (for one cycle), the projection lenses 11 and 21 are coherently coupled even if the decentered Fresnel lens 30S is in a defocus state, and accordingly, the image of the LCD 12 can be reproduced on the screen 22.

The requirement that the diameter of the circle of confusion of the intermediate image 13 on the decentered Fresnel lens 30S is larger than the Fresnel pitch (cycle) of the Fresnel lens 30S can be also achieved by intentionally providing an aberration, for example a spherical aberration or coma, etc., on the projection lenses 11 and 21. To this end, reference will be made below to an embodiment shown in FIG. 5, in comparison with FIG. 4 which shows optical paths corresponding to FIG. 2.

Figure 4:
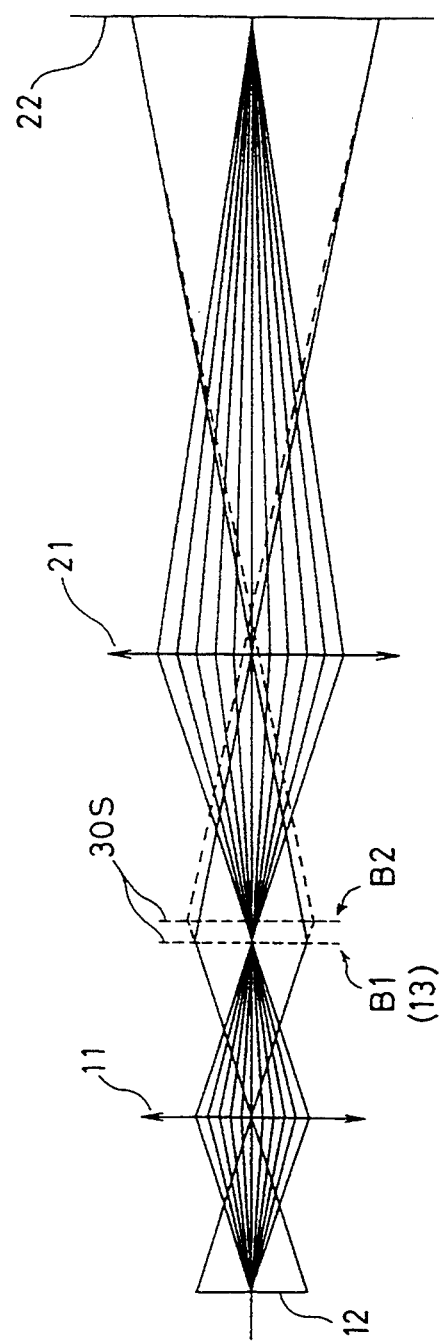
FIG. 4 is a schematic diagram of an optical system shown in FIG. 3.

In FIG. 4, the spherical aberration of the projection lenses 11 and 21 is corrected. Namely, when the decentered Fresnel lens 30S is located at a position B1 of the paraxial image surface (i.e., intermediate image 13) of the projection lens 11, the moire fringes of the decentered Fresnel lens 30S appear, but when the decentered Fresnel lens 30S is located at a position B2 which is deviated from the position B1 by a predetermined defocus amount, the moire fringes do not appear.

Figure 5:
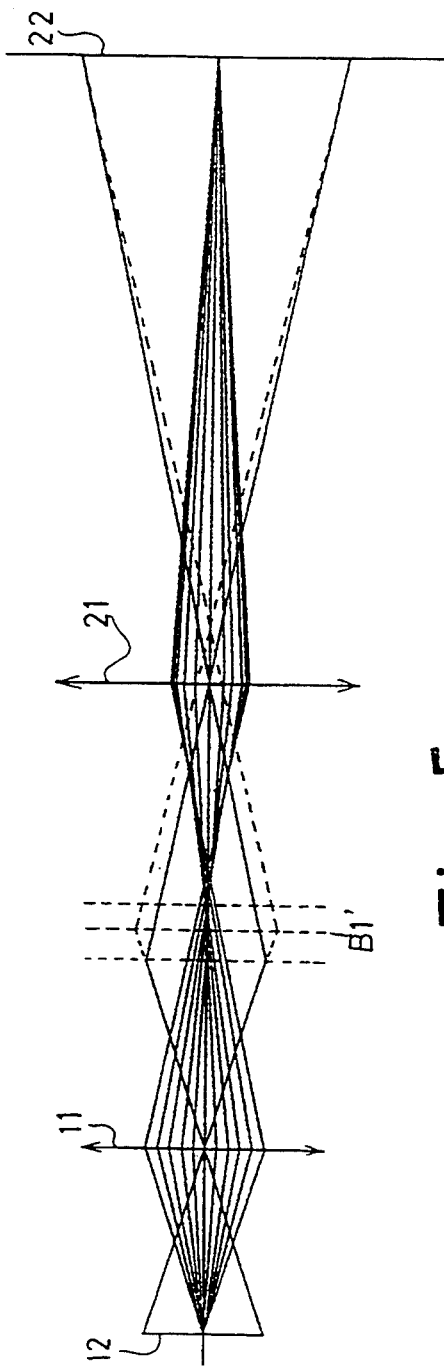
FIG. 5 is a schematic diagram of a modified embodiment of an optical system shown in FIG. 3.

In FIG. 5, there are an over spherical aberration of the projection lens 11 and an under spherical aberration of the projection lens 21. Consequently, even if the decentered Fresnel lens 30S is located at a position B1' of the paraxial image surface of the projection lens 11, the diameter of the circle of confusion of the intermediate image 13 on the decentered Fresnel lens 30S is larger than the Fresnel pitch, so that no moire fringes appear.

Figure 3:
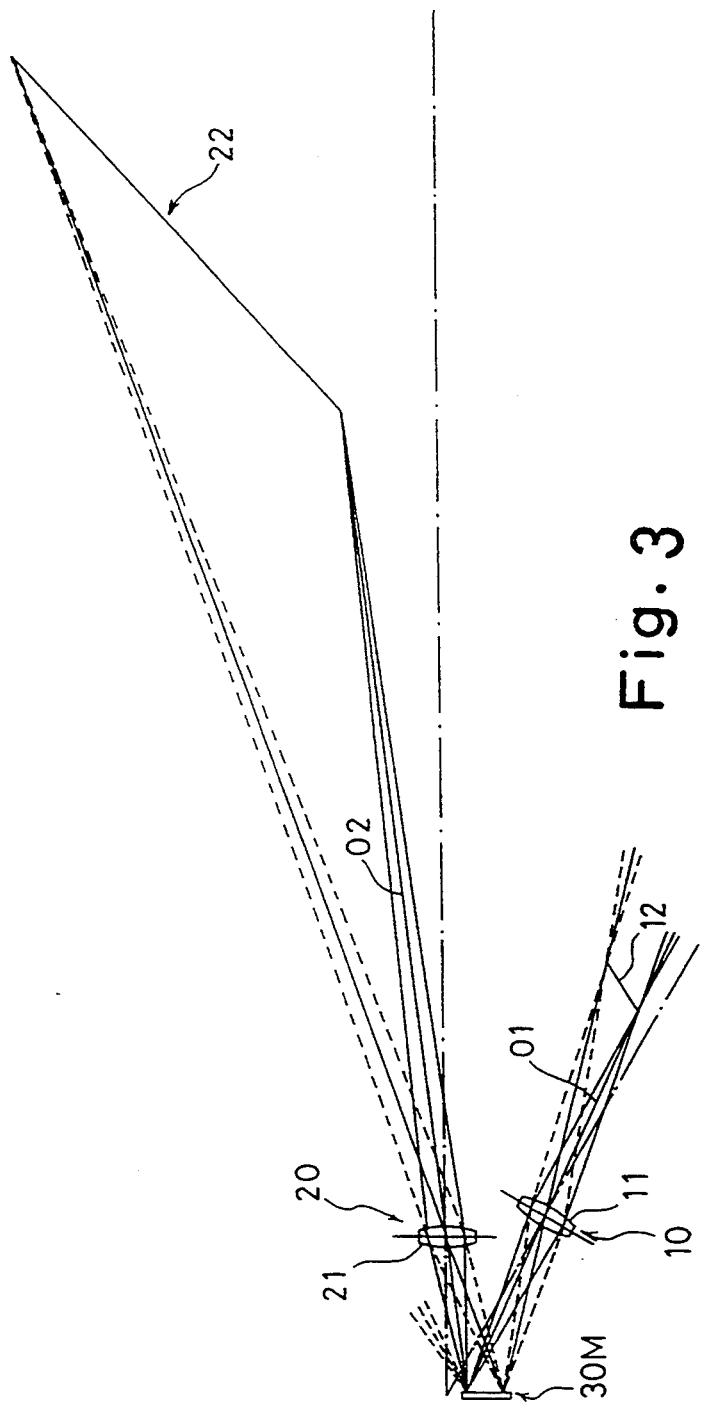
FIG. 3 is a schematic optical connection diagram of still another embodiment of a projecting optical system according to a first aspect of the present invention.

FIG. 3 shows another embodiment in which a decentered Fresnel mirror 30M is used as the decentered Fresnel optical element. In this embodiment, if the various requirements are determined such that the diameter of the circle of confusion of the intermediate image 13 on the decentered Fresnel mirror 30M is larger than the Fresnel pitch, no moire fringes appear, similar to the decentered Fresnel lens 30S mentioned above.

As can be seen from the foregoing, according to a first aspect of the present invention, in a projecting optical system in which two projection lens systems whose optical axes intersect are coupled by an optical element having a structural periodicity, fringes resulting from the periodic structure are not projected onto the screen. Moreover, according to the present invention, if the image indicating element or the screen has a periodic structure, moire fringes is produced on the screen.

Figure 6:
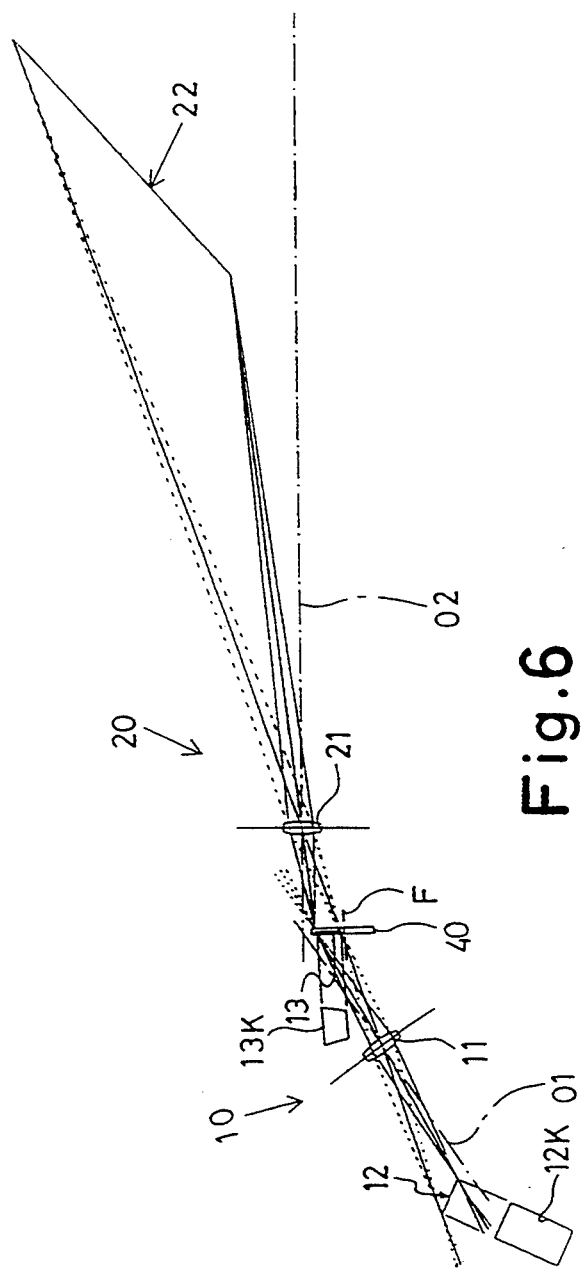
FIG. 6 is a schematic optical connection diagram of an embodiment of a projecting optical system according to a second aspect of the present invention.

FIGS. 6 through 9 show several embodiments of a projecting optical system according to a second aspect of the present invention. In FIG. 6, a decentered Fresnel lens 40 having a diffusion property is used as the pupil conjugate-coupling element (device), instead of the decentered lens 23 shown in FIG. 25. In this embodiment, the intermediate image 13 is formed within the diffusive decentered Fresnel lens 40. The center axis F1 of the diffusive decentered Fresnel lens 40 is offset from the optical axis O2 of the second projection lens system 20.

Figure 7:
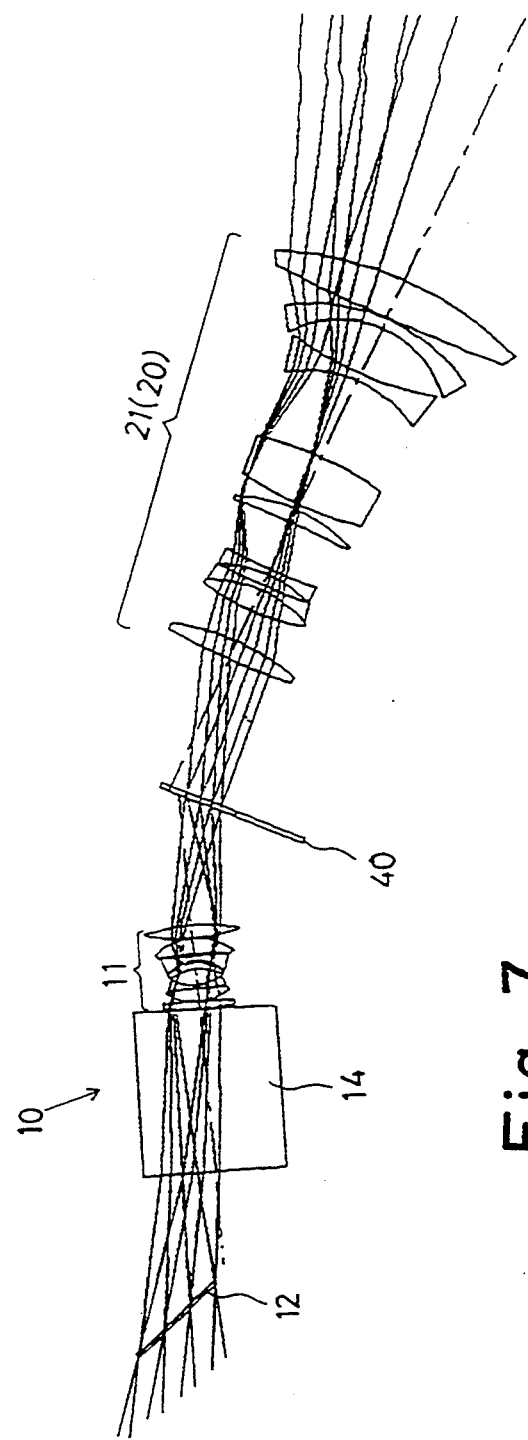
FIG. 7 is a schematic optical connection diagram of another embodiment of a projecting optical system according to a second aspect of the present invention.

FIG. 7 shows another embodiment in which the invention is applied to a triplet type color liquid crystal projector. The basic structure of FIG. 7 is the same as FIG. 1. Namely, three colors of image light R, G and B by the LCD 12 of the first projection lens system 10 and LCD's (not shown) provided on opposite sides of the dichroic mirror 14 in a direction perpendicular to the sheet of the drawings are combined by the dichroic mirror 14 and are then incident upon the projection lens 11. The second projecting lens system 20 is represented by the projection lens 21 in FIG. 7.

A pupil conjugate-coupling element (device) 30 which couples the pupils of the first and second projection lens systems 10 and 20 according to the present invention is comprised of a diffusive decentered Fresnel lens 40 which is provided with a Fresnel surface 40a adjacent to the first projection lens system 10, and a diffusion surface 40b adjacent to the second projection lens system 20. The intermediate image 13 is formed on the diffusion surface 40b of the diffusive decentered Fresnel lens 40, as shown in FIG. 8.

Note that the intermediate image 13 is preferably formed on the diffusion surface 40b of the diffusive decentered Fresnel lens 40, as mentioned above. This is because if the intermediate image 13 was formed on the Fresnel surface 40a instead, the image of the intermediate image 13 on the diffusion surface 40b (objective surface of the second projection lens system) would be out of focus (defocus state), so that no defocus image (deteriorated image quality) can be improved by the second projection lens system in the coherent coupling through the diffusion surface.

Figure 9A:
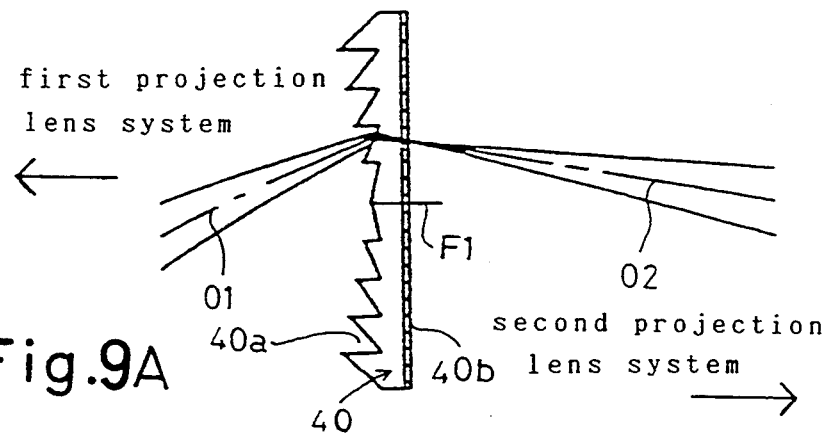
FIGS. 9A, 9B and 9C are schematic views of different embodiments of a decentered Fresnel lens having a diffusion surface.
Figure 9B:
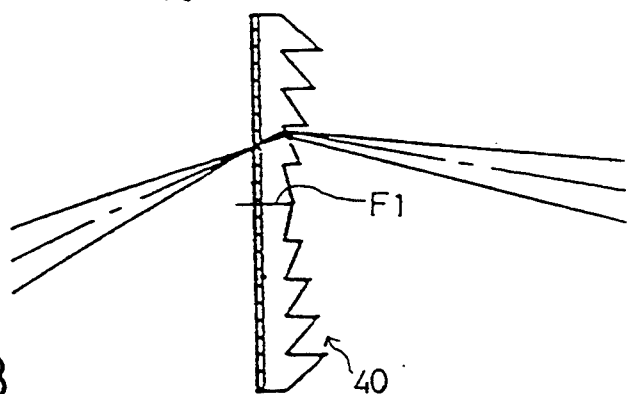
Figure 9C:
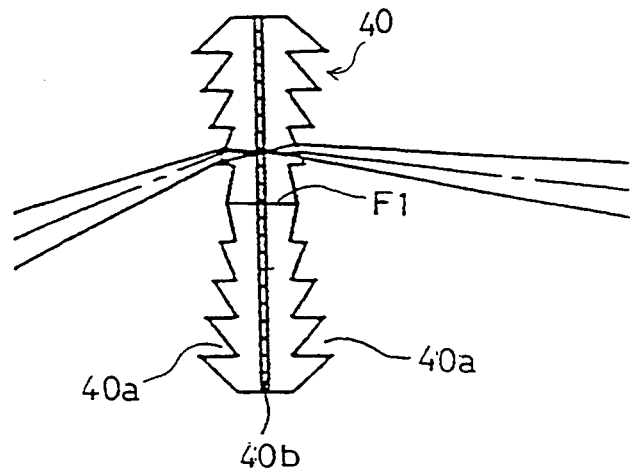

FIGS. 9A through 9C and 10A through 10C show several examples of the diffusive decentered Fresnel lens 40. In FIGS. 9A through 9C, the diffusive decentered Fresnel lens 40 is provided on one side thereof with the Fresnel surface 40a, and on the other side, with the diffusion surface 40b, respectively. The Fresnel surface 40a is located adjacent to the first projection lens system 10 in FIG. 9A. The diffusion surface 40b is located adjacent to the first projection lens system 10 in FIG. 9B. In FIG. 9C, the diffusion surfaces 40b of a pair of diffusive decentered Fresnel lenses 40 are in contact to form one diffusion surface, and the Fresnel surfaces 40a of the diffusive decentered Fresnel lenses 40 are located adjacent to the first and second projection lens systems 10 and 20, respectively. In FIGS. 9A through 9C, the intermediate image 13 is converged within the diffusion surface 40b.

FIGS. 10A through 10C show several examples of the decentered Fresnel lens 40Z which is entirely made of a diffusive material. Similarly to FIGS. 9A through 9C, the Fresnel surface 40a is located adjacent to the first projection lens system 10 (FIG. 10A); the Fresnel surface 40a is located adjacent to the second projection lens system 20 (FIG. 10B); and opposite flat end surfaces 40c of a pair of diffusive decentered Fresnel lenses 40 are in contact, so that the Fresnel surfaces 40a thereof are located adjacent to the first and second projection lens systems 10 and 20, respectively. In FIGS. 10A through 10C, the intermediate image 13 is converged within the diffusive decentered Fresnel lens 40. In the arrangements shown in FIGS. 10A through 10C, the position at which the intermediate image 13 is to be converged is closer to the Fresnel surface 40a than the arrangements shown in FIGS. 9A through 9C, and accordingly, no or less aberration occurs.

In the arrangement shown in FIG. 9C or 10C, the power of each decentered Fresnel lens 40 or 40Z can be reduced. In addition to the foregoing, a pair of decentered Fresnel lenses 40 or 40Z are adhered at the diffusion surfaces 40b or the flat end surfaces 40c thereof. Alternatively, it is possible to use the diffusive decentered Fresnel lens 40 shown in FIGS. 9A through 9C and the diffusive decentered Fresnel lens 40Z shown in FIGS. 10A through 10C in combination. In this alternative, the diffusive decentered Fresnel lenses 40 and 40Z are adhered in the same fashion as FIG. 9C or 10C.

It was experimentally confirmed that the moire fringes and the Fresnel fringes were less conspicuous when the Fresnel surface 40a was next to the first projection lens system 10 than when the Fresnel surface 40a was next to the second projection lens system 20. As can be understood from the above discussion, according to the second aspect of the present invention, in a projecting optical system in which two projection lens systems whose optical axes intersect are coupled by an optical element having a structural periodicity, the optical element is provided with a diffusion surface or surfaces, so that fringes resulting from the periodic structure are not projected onto the screen. Moreover, according to the present invention, if the image indicating element or the screen has a cyclic structure, moire fringes are not produced on the screen.

Figure 11:
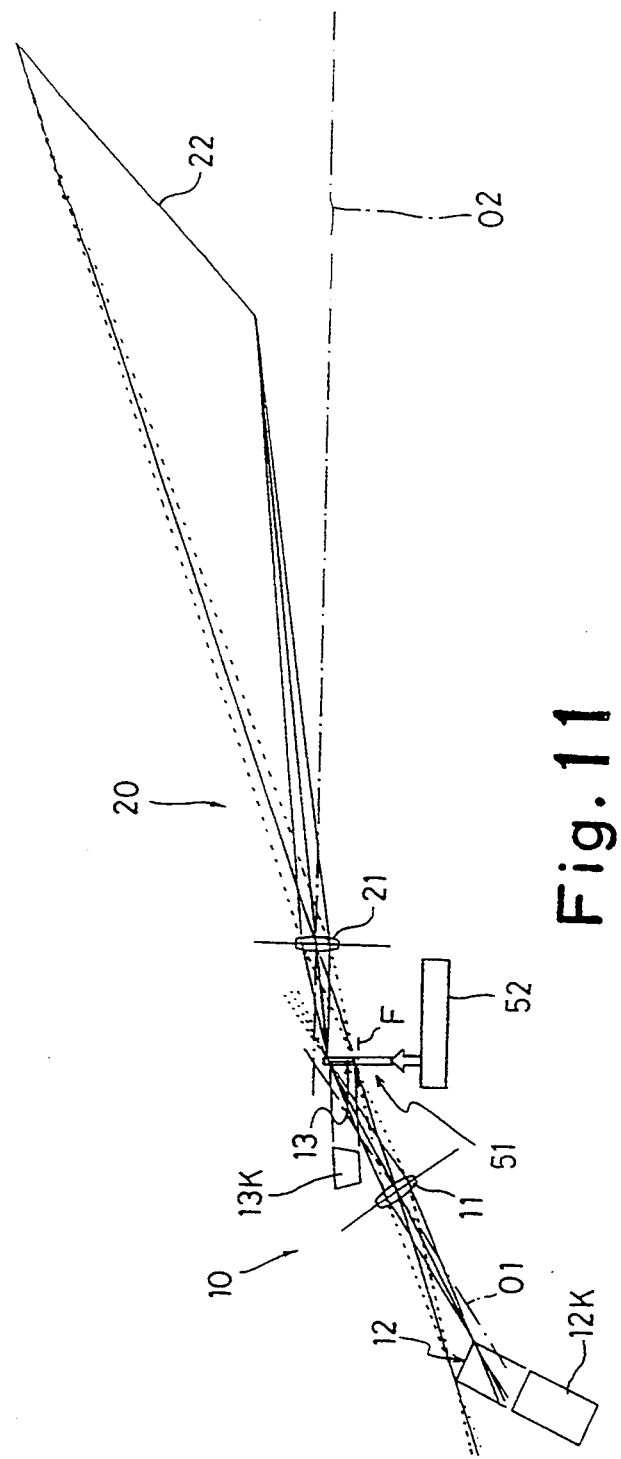
FIG. 11 is a schematic optical connection diagram of an embodiment of a projecting optical system according to a third aspect of the present invention.
Figure 12:
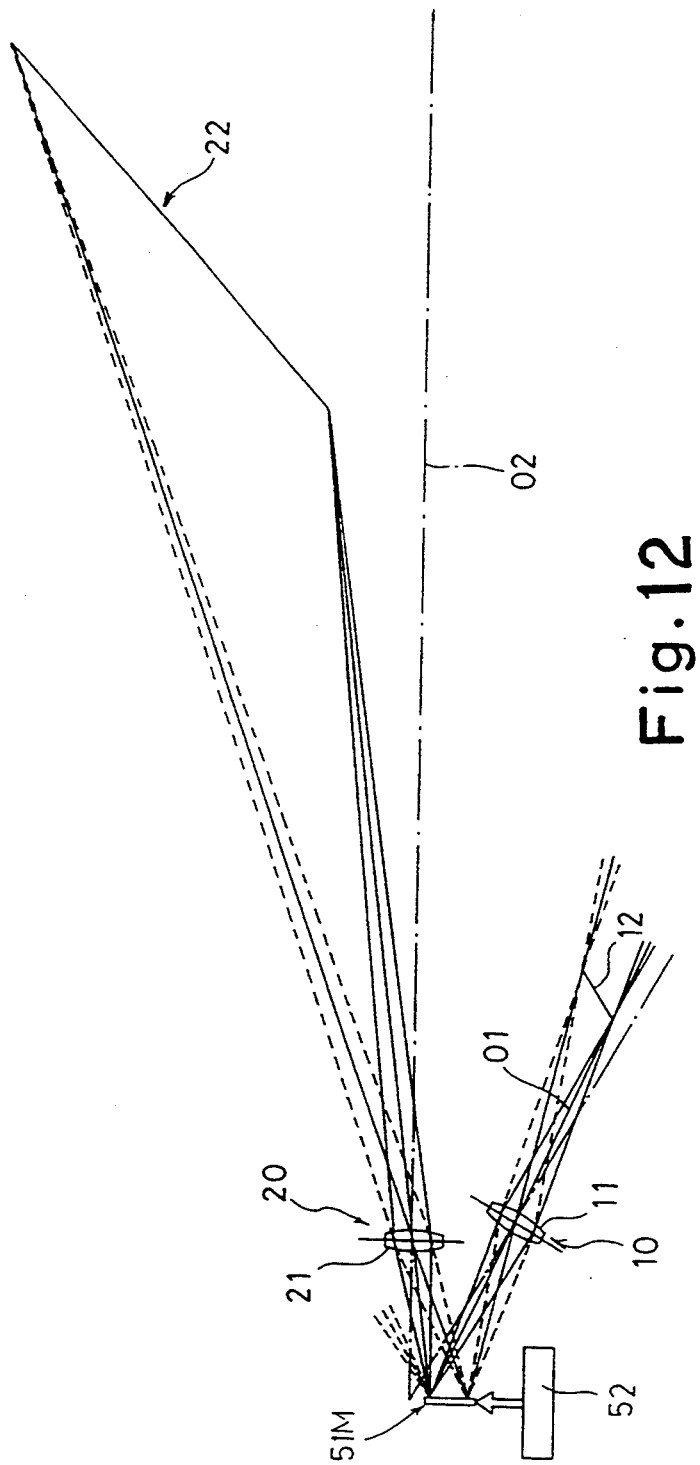
FIG. 12 is a schematic optical connection diagram of another embodiment of a projecting optical system according to a third aspect of the present invention.
Figure 13:
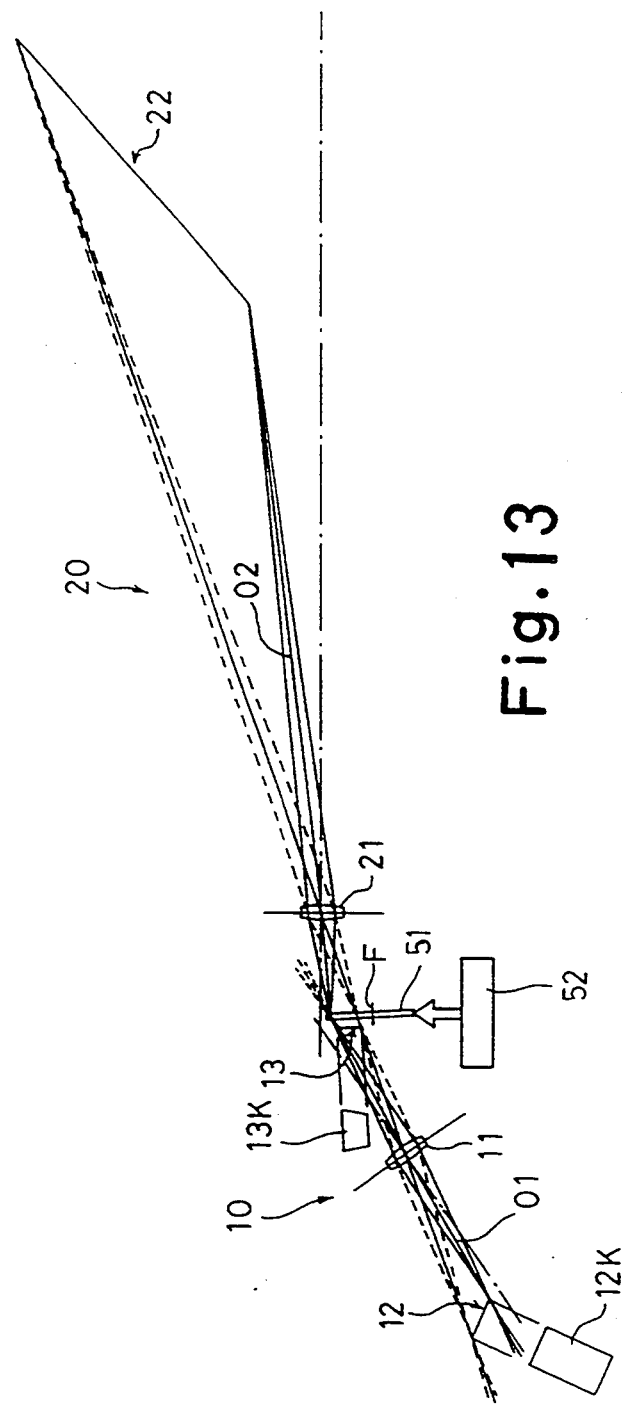
FIG. 13 is a schematic optical connection diagram of still another embodiment of a projecting optical system according to a third aspect of the present invention.

FIGS. 11 through 13 show several embodiments of a projecting optical system according to a third aspect of the present invention. In FIG. 11, a decentered Fresnel lens 51 connected to a vibrator 52 is used instead of the decentered lens 23 shown in FIG. 25. The vibrator 52 oscillates the decentered Fresnel lens 51 in the direction perpendicular to the optical axis O2 of the second projection lens system 20 and intersecting the optical axis O1 of the first projection lens system 10. The decentered Fresnel lens 51 has a positive power and a prism function similar to the decentered lens 23. The center axis F of the decentered Fresnel lens 51 is offset from the optical axis O2. The intermediate image 13 is formed within the decentered Fresnel lens 51.

The amplitude and cycle (frequency) of the oscillation of the decentered Fresnel lens 51 caused by the vibrator 52 which is per se known are determined taking the resolving power of human eyes into account, so that fringes resulting from the decentered Fresnel lens 51 are not projected onto the screen 22. Consequently, if the image indicating element 12 has a structural periodicity, moire fringes which are caused by the interference of the structure of the image indicating element 12 with the periodic structure of the decentered Fresnel lens 51 will not be visible. Note that although the periodic structure of the image indicating element (LCD) 12 is projected onto the screen 22, this does not directly relate to the subject of the present invention to be improved.

FIG. 12 shows another embodiment of the invention in which a decentered Fresnel mirror 31M is used as the decentered Fresnel optical element. In this embodiment, the decentered Fresnel mirror 31M is arranged such that the intermediate image 13 is formed thereon. The decentered Fresnel mirror 30M is oscillated by the vibrator 52 in the direction perpendicular to the optical axis O2 and intersecting the optical axis O1, similarly to FIG. 11.

FIG. 13 shows still another embodiment of the invention in which the decentered Fresnel lens 51 is located at a position separate from the intermediate image 13. Namely, the decentered Fresnel lens 51 is located behind the position of the intermediate image 13. In this embodiment, the image of the Fresnel fringes of the decentered Fresnel lens 51 formed by the second projection lens system 20 is dimmed on the screen 22. In theory, if the decentered Fresnel lens 51 is arranged such that the diameter of the circle of confusion of the intermediate image 13 on the decentered Fresnel lens 51 is larger than the Fresnel pitch (cycle) of the decentered Fresnel lens 51, no Fresnel fringe would appear on the screen even if the decentered Fresnel lens 51 is not vibrated.

Nevertheless, in the present invention, since the decentered Fresnel lens 51 is vibrated by the vibrator 52, the deviation (i.e., defocus amount) of the decentered Fresnel lens 51 from the position of the intermediate image 13 can be decreased. The combination of the defocus and the vibration makes it possible to more effectively prevent the Fresnel fringes or the moire fringes from appearing on the screen.

Note that it is possible to deviate the decentered Fresnel mirror 31M from the position of the intermediate image 13 by a predetermined defocus amount also in the embodiment illustrated in FIG. 12.

As can be understood from the above discussion, according to the third aspect of the present invention, in a projecting optical system in which two projection lens systems whose optical axes intersect are coupled by an optical element having a structural periodicity, since the optical element vibrating means (vibrator) is provided to oscillate the optical element having a structural periodicity in the direction intersecting the optical axis, fringes resulting from the periodic structure are not projected onto the screen. Moreover, according to the present invention, if the image indicating element or the screen has a cyclic structure, moire fringes are not produced on the screen.

FIGS. 14 through 21 show several embodiments of a projecting optical system according to a fourth aspect of the present invention. In the embodiment illustrated in FIG. 14, the decentered lens 23 shown in FIG. 25 is replaced with a decentered Fresnel lens 61 which is connected to a motor 62 through a drive shaft thereof. The decentered Fresnel lens 61 has a positive power and a prism function, similar to the decentered lens 23. The center axis F of the decentered Fresnel lens 61 is offset from the optical axis O2. The intermediate image 13 is formed within the decentered Fresnel lens 61.

Figure 14:
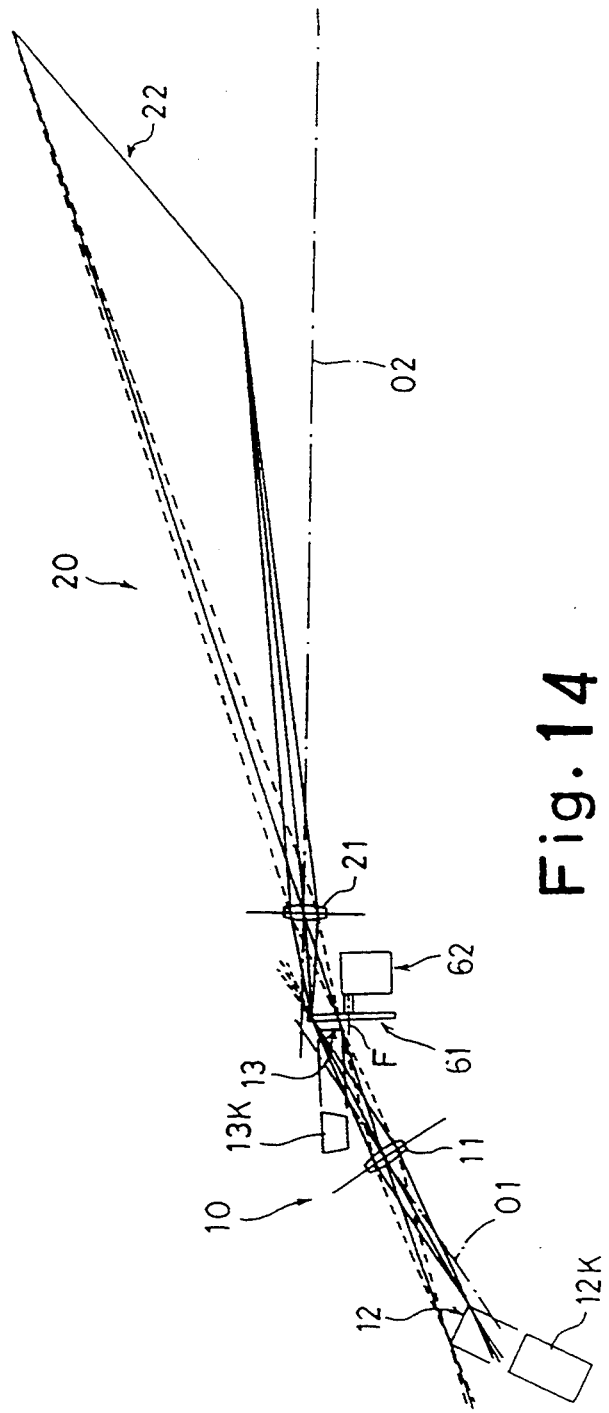
FIG. 14 is a schematic optical connection diagram of an embodiment of a projecting optical system according to a fourth aspect of the present invention.
Figure 15:
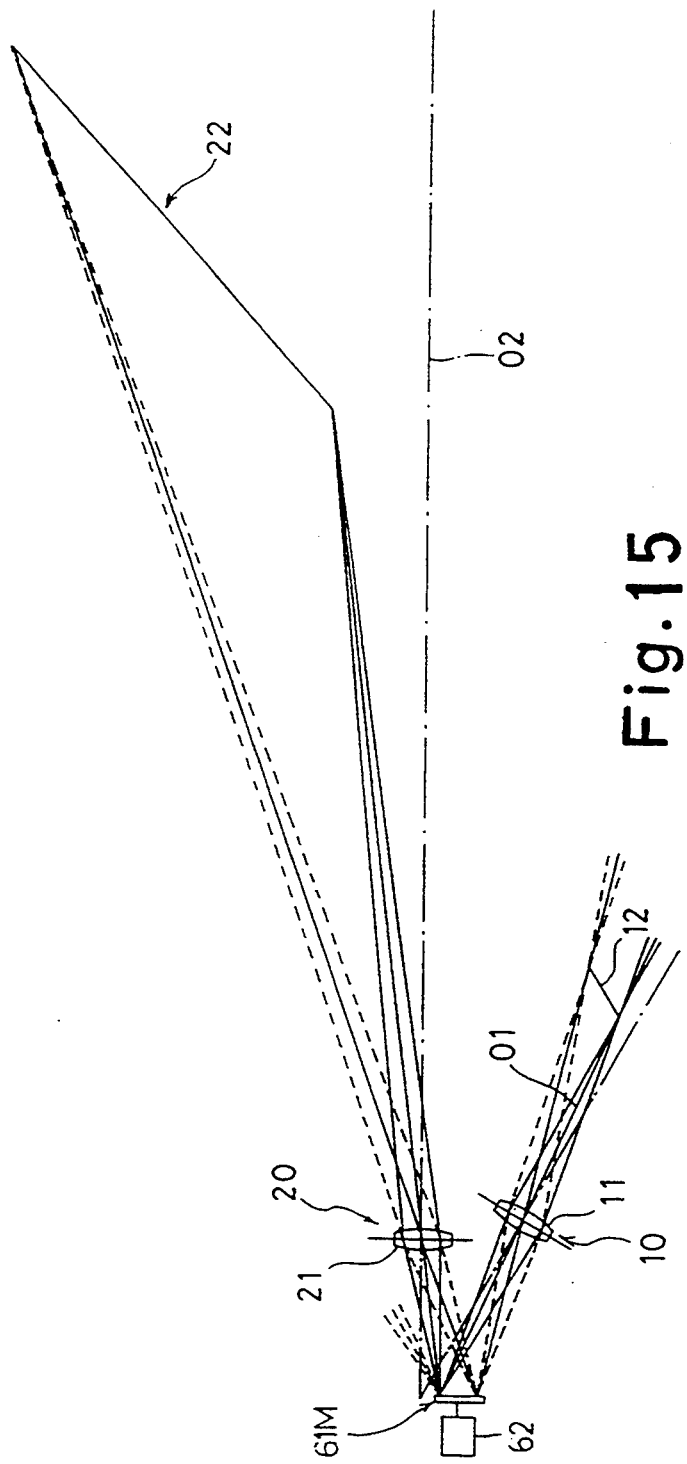
FIG. 15 is a schematic optical connection diagram of another embodiment of a projecting optical system according to a fourth aspect of the present invention.

In a modified embodiment shown in FIG. 15 in which a decentered Fresnel mirror 61M is used as the decentered Fresnel optical element, the intermediate image 13 is formed on the decentered Fresnel mirror 61M. The decentered Fresnel mirror 61M is connected at the center portion thereof to the drive shaft of the motor 62, similarly to the arrangement shown in FIG. 14.

Figure 16:
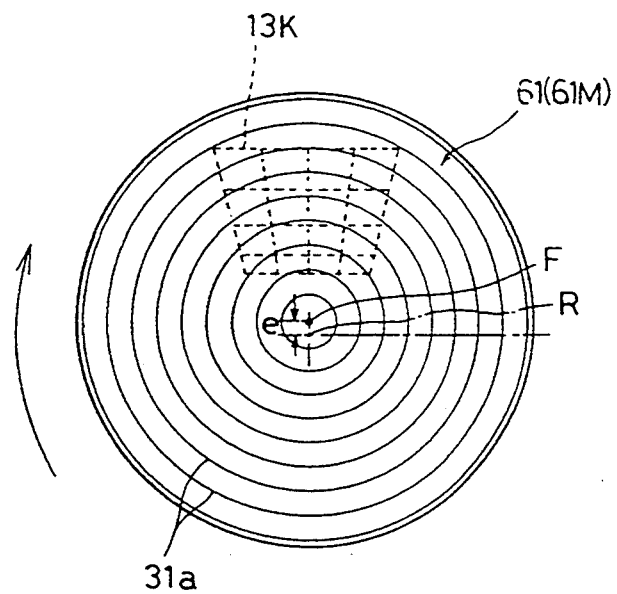
FIG. 16 is a front elevational view of a decentered Fresnel lens or mirror used in the present invention.
Figure 17:
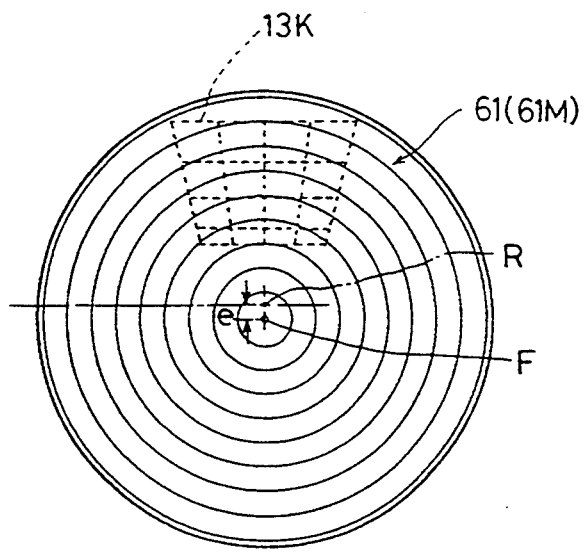
FIG. 17 is a front elevational view of a decentered Fresnel lens or mirror shown in an angular position different from FIG. 16.

FIGS. 16 and 17 show a relationship between the decentered Fresnel lens 61 (or decentered Fresnel mirror 61M) and a center of rotation thereof. The decentered Fresnel lens 61 includes a group of concentric prisms (i. e., annular bands) 61a whose center is located on the center axis F. The center of rotation R of the decentered Fresnel lens 61 by the motor 62 is deviated from the center axis (i.e., optical center) F by an offset "e". In view of a large number of concentrical circles about the center of rotation R, the structural periodicity of the decentered Fresnel lens 61 changes on the concentrical circles. There is an angular phase difference of 180° about the center of rotation R between FIGS. 16 and 17.

When the decentered Fresnel lens 61 is rotated about the center of rotation R, the position of the periodic structure (i.e., Fresnel fringes 61a) of the decentered Fresnel lens 61 that is located at the pupil coupling position at which the pupils of the projection lens systems 10 and 20 are coupled continuously changes. Consequently, no Fresnel fringe projected onto the screen 22 would be viewed by a viewer if the rotational speed and/or the offset "e" of the decentered Fresnel lens 61 are appropriately set.

Furthermore, if the image indicating element 12 has a periodic structure, moire fringes which would be produced by an interference of the periodic structure of the image indicating element 12 with the periodic structure of the decentered Fresnel lens 61 will not be visible. Note that although the periodic structure of the image indicating element (LCD) 12 is projected onto the screen 22, the subject of the present invention is not directly focused on the projection of the periodic structure of the LCD 12 onto the screen.

If the decentered Fresnel lens 61 is rotated about the optical axis F, the effect discussed above would not be expected. This is because there is no change in the periodic concentric circles about the center of rotation. In other words there is no change in the position of the periodic structure to be projected in accordance with the rotation.

Figure 18:
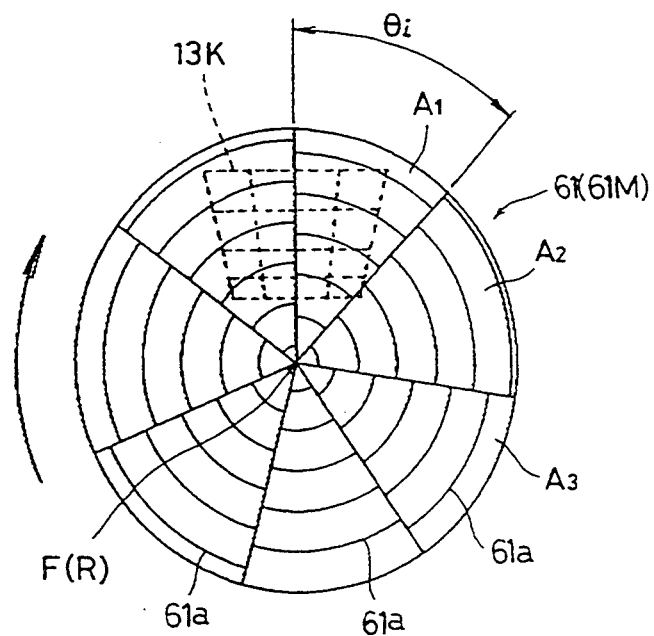
FIG. 18 is a front elevational view of another decentered Fresnel lens or mirror used in the present invention.

FIG. 18 shows another embodiment of the decentered Fresnel lens 61 (or decentered Fresnel mirror 61M). In the arrangement shown in FIG. 18, the optical axis F is identical to the center of rotation R. The decentered Fresnel lens 61 is split into a plurality of sector areas Ai (A1, A2, . . .) whose center is located on the optical axis F (center of rotation R). Each sector area Ai is made of a decentered Fresnel lens in a sector shape. The prisms (optical rings) 61a of the sector areas Ai have different pitches and/or phases. The sector areas Ai preferably have different sizes, i.e., angles $\theta$ i.

Figure 19:
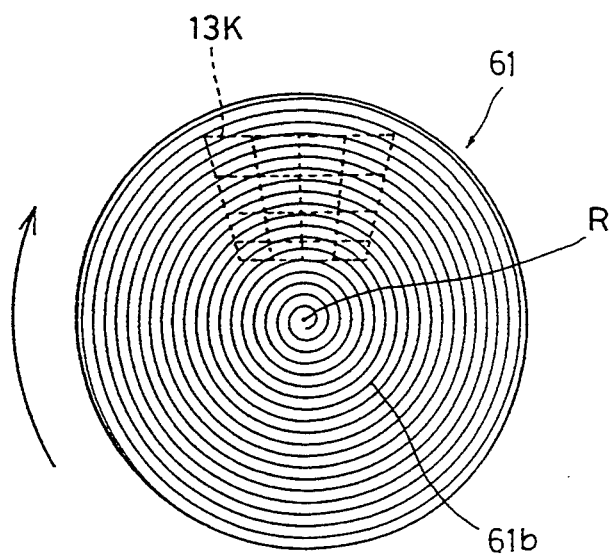
FIG. 19 is a front elevational view of another decentered Fresnel lens or mirror used in the present invention.

FIG. 19 shows still another embodiment of the decentered Fresnel lens 61 (or decentered Fresnel mirror 61M). In the embodiment shown in FIG. 19, the prisms (i.e., optical rings) 61b of the decentered Fresnel lens 61 are in the form of a spiral extending from the vicinity of the center of rotation R. In both the embodiments shown in FIGS. 18 and 19, the substantially concentric structures periodically arranged about the center of rotation R change. Hence the same operation and effect as those shown in FIGS. 16 and 17 can be obtained.

Figure 20:
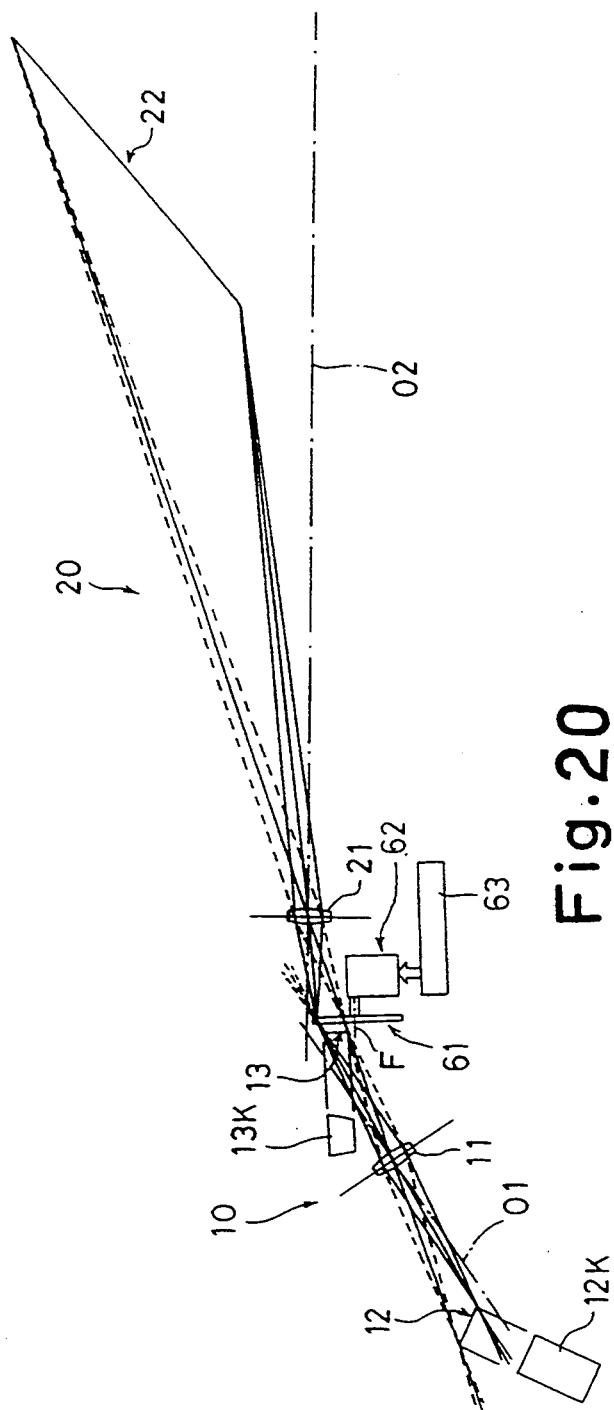
FIG. 20 is a schematic diagram of an optical connection of another embodiment of a projecting optical system according to the present invention.

FIG. 20 shows another embodiment of the present invention, in which the decentered Fresnel lens 61 and the motor 62 shown in FIG. 14 are both connected to the vibrator 63 to vibrate the decentered Fresnel lens 61 in the direction perpendicular to the optical axis O2 and intersecting the optical axis O1. The amplitude and cycle (frequency) of the oscillation of the decentered Fresnel lens 61 are determined taking the resolving power of human eyes into account, so that the periodic structures (i.e., Fresnel fringes) of the decentered Fresnel lens 61 are not projected onto the screen 22. Since the decentered Fresnel lens 61 is subject to oscillation as well as the rotation, the amplitude and cycle of the oscillation can be determined in view of the effects of the oscillation and the rotation.

Figure 21:
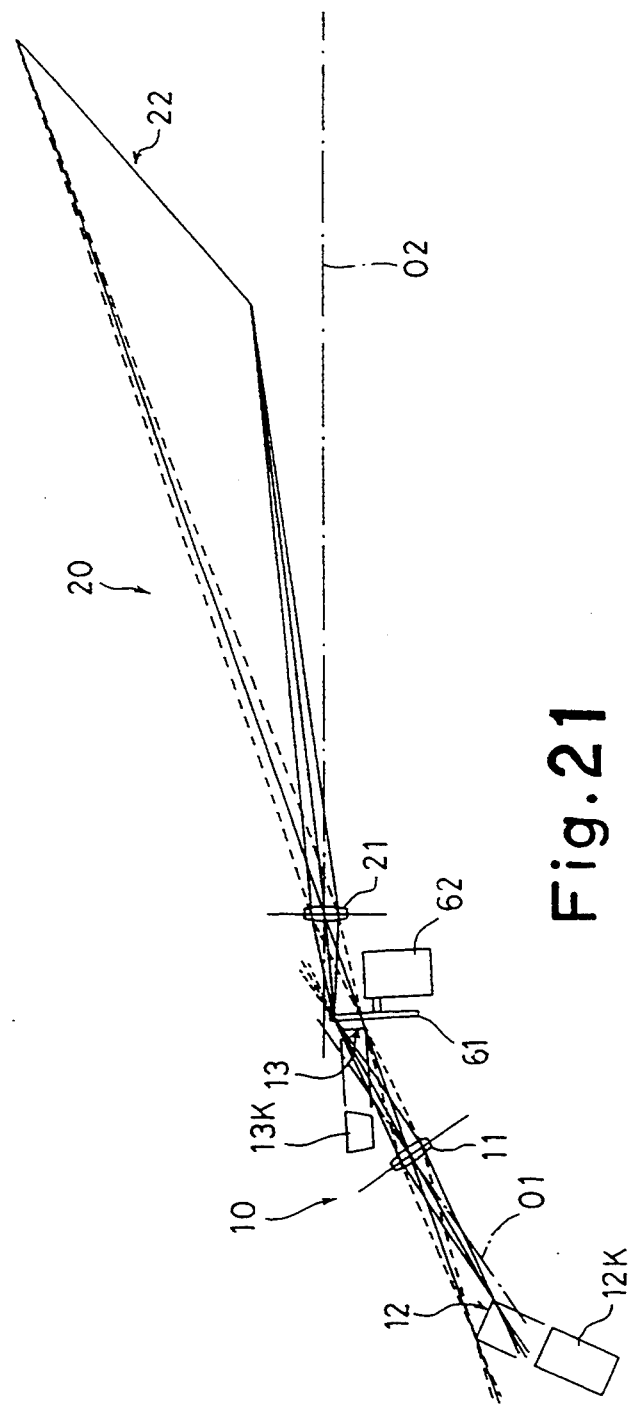
FIG. 21 is a schematic optical connection diagram of another embodiment of a projecting optical system according to a fourth aspect of the present invention.

FIG. 21 shows yet another embodiment of the invention, in which the decentered Fresnel mirror 61 is located at a position different from the position of the intermediate image 13. Namely, the decentered Fresnel lens 61 is located behind the position of the intermediate image 13. In this embodiment, the image of the Fresnel fringes of the decentered Fresnel lens 61 formed by the second projection lens system 20 is dimmed on the screen 22. In theory, if the decentered Fresnel lens 61 is arranged such that the diameter of the circle of confusion of the intermediate image 13 on the decentered Fresnel lens 51 is larger than the Fresnel pitch (cycle) of the decentered Fresnel lens 61, no Fresnel fringe would appear on the screen even if the decentered Fresnel lens 51 is not rotated by the motor 62.

Nevertheless, in the present invention, since the decentered Fresnel lens 61 is rotated by the motor 62, the deviation (i.e., defocus amount) of the decentered Fresnel lens 61 from the position of the intermediate image 13 can be decreased. The combination of the defocus and the rotation makes it possible to more effectively prevent the Fresnel fringes or the moire fringes from appearing on the screen.

Note that it is possible to deviate the decentered Fresnel mirror 61M from the position of the intermediate image 13 by a predetermined defocus amount also in the embodiment illustrated in FIG. 15.

Figure 22:
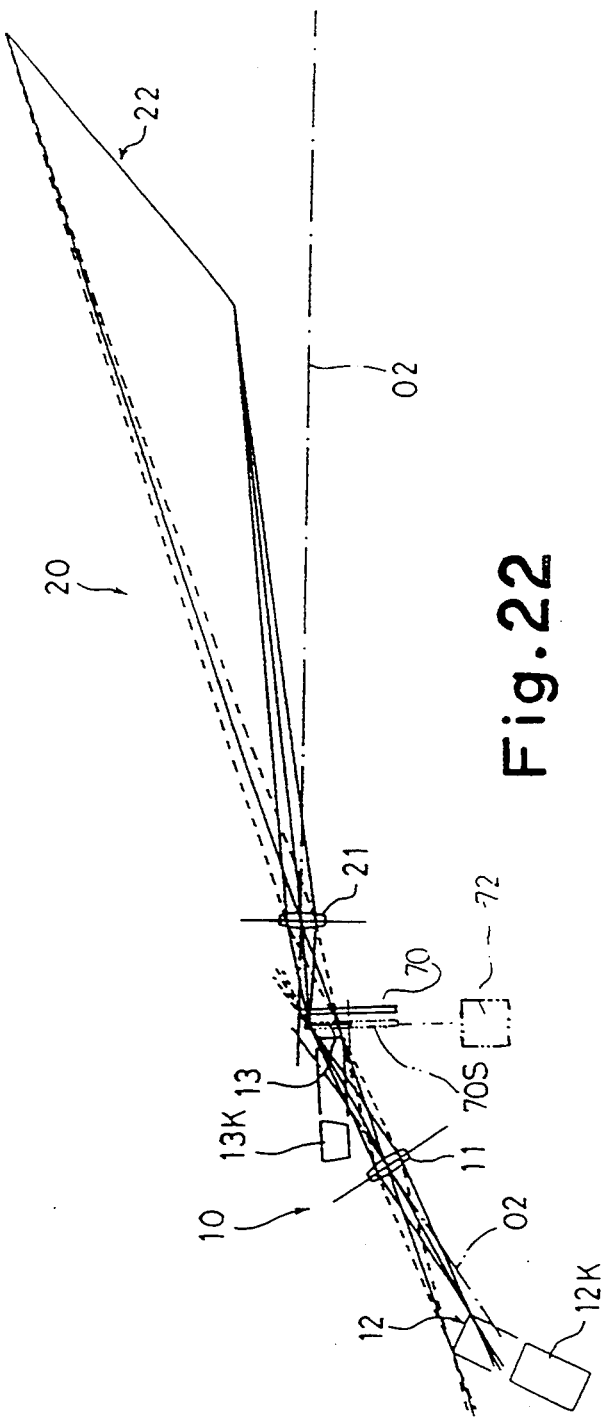
FIG. 22 is a a schematic optical connection diagram of an embodiment of a projecting optical system according to a fifth aspect of the present invention.
Figure 23:
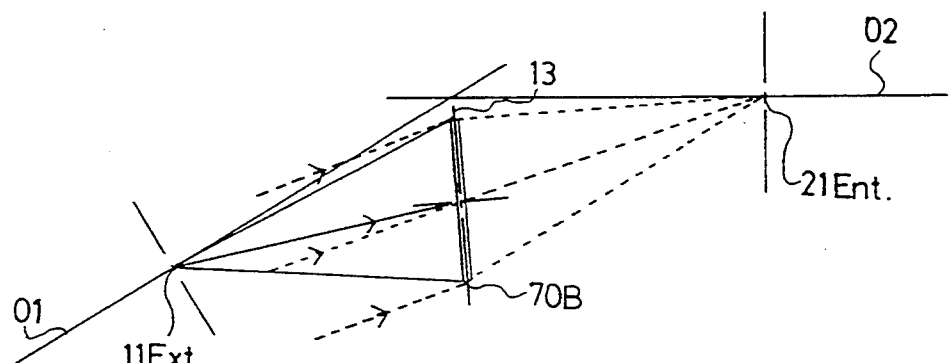
FIG. 23 is an explanatory view of a preparation of a hologram used in an embodiment shown in FIG. 24.

FIGS. 22 and 23 show an embodiment of a projecting optical system according to a fifth and sixth aspects of the present invention, in which the decentered lens 23 shown in FIG. 25 is replaced with a hologram 70. The hologram 70 converges the bundle of rays emitted from the exit pupil of the projection lens 11 of the first projection lens system 10 onto the entrance pupil of the projection lens 21 of the second projection lens system 20. The hologram 70 can be constructed, based on the optical principle shown in FIG. 23 by way of example. In FIG. 23, the exit pupil of the projection lens 11 and the entrance pupil of the projection lens 21 are represented by 11Ext and 21Ent. in FIG. 23, respectively. A photosensitive material 70B is located at the position of the intermediate image 13 formed by the projection lens 11, so that the interference fringes produced by the interference of diverging light emitted from a light source located at the exit pupil 11Ext. of the projection lens 11 with parallel light to be converged onto the entrance pupil 21Ent. of the project ion lens 21 are recorded on the photosensitive material 70B to construct the hologram 70.

If the hologram 70 thus obtained is located at the position of the intermediate image 13 in the optical system shown in FIG. 22, the hologram 70 serves as an optical element having a positive power and a prism function to deflect the bundle of rays transmitted through the first projection lens system 10 towards the optical axis of the second projection lens system 20. However, in case that hologram is located at the position of the intermediate image 13, the fringes of the hologram 70 is projected onto the screen.

According to the fifth aspect of the present invention, to avoid the fringes of the hologram 70 being projected onto the screen, the hologram 70 is deviated from an intermediate image forming position at which the intermediate image 13 is formed by a predetermined offset in the optical axis direction thereof, similar to the first aspect of the present invention.

Further, two dotted chain line shows the sixth aspect of the present invention. In this aspect, the hologram 70S is positioned at an intermediate image forming position at which the intermediate image 13 is formed, and the hologram 70S is oscillated by a vibrator 72 in a direction intersecting the optical axis. This embodiment corresponds to the embodiment shown in FIG. 11 in which decentered Fresnel lens 51 is replaced by the hologram 70S. Therefore, the amplitude and cycle of the oscillation of the Fresnel lens 51 should be applied to the hologram 70S, by replacing the cycle of the periodic structure of the Fresnel lens 51 to the distances of fringes of the hologram 70S.

According to the fifth and sixth aspects of the present invention, the simple hologram which is a very thin optical element can realize a projecting optical system in which neither the fringes of the hologram 70 or 70S nor the moire fringes appear on the screen.

Although the above-mentioned embodiments have been all applied to an optical system in which two projection lens systems are coupled by a single pupil conjugate-coupling element, the present invention can be applied to an optical system in which more than two projection lens systems are coupled by the single pupil conjugate-coupling element.

As can be understood from the above discussion, according to the present invention, in a projecting optical system in which at least two projection lens systems whose optical axes intersect are coupled by an optical element having a structural periodicity, fringes of the periodic structure do not appear on the screen. In addition to the foregoing, according to the present invention, if the image indicating element or the screen has a periodic structure, moire fringes are not produced on the screen.

We claim:

1. A pupil conjugate-coupling device in a projecting optical system comprising:
   a first projection lens system which forms an intermediate image of an image indicating element,
   a second projection lens system which projects said intermediate image onto a screen,
   said first and second projection lens systems having optical axes intersecting at a predetermined angle, and,
   an optical element having structural periodicity positioned between said first and second projection lens systems, said optical element having a positive power and a prism function for deflecting a bundle of rays transmitted through said first projection lens system towards an optical axis of said second projection lens system to thereby couple pupils of said first and second projection lens systems,
   wherein said optical element is deviated from an intermediate image forming position by a predetermined offset in an optical axis direction.

2. A pupil conjugate-coupling device according to claim 1, wherein said optical element having structural periodicity is comprised of a decentered Fresnel lens.

3. A pupil conjugate-coupling device according to claim 2, wherein said decentered Fresnel lens is comprised of a plurality of split Fresnel lens elements having substantially equivalent optical characteristics and located on opposite sides of said intermediate image forming position.

4. A pupil conjugate-coupling device according to claim 3, further comprising at least one aberration compensating lens between said Fresnel lens elements to correct an aberration caused by said Fresnel lens elements.

5. A pupil conjugate-coupling device according to claim 4, wherein said aberration compensating lens comprises a positive power lens and a negative power lens.

6. A pupil conjugate-coupling device according to claim 1, wherein an extension plane of said screen of said second projection lens system, a plane passing through a principal point of said first projection lens and perpendicular to said optical axis, and an extension plane of said intermediate image intersect on a straight line, and wherein an extension plane of said screen of said second projection lens system, a plane passing through a principal point of said first projection lens and perpendicular to said optical axis, and an extension plane of said intermediate image intersect on a straight line.

7. A pupil conjugate-coupling device according to claim 1, wherein said intermediate image includes a trapezoidal distortion and an image projected onto said screen includes no trapezoidal distortion.

8. A pupil conjugate-coupling device in a projecting optical system comprising:
- a first projection lens system which forms an intermediate image of an image indicating element,
- a second projection lens system which projects said intermediate image onto a screen,
- said first and second projection lens systems having optical axes intersecting at a predetermined angle, and a decentered Fresnel optical element having structural periodicity positioned between said first and second projection lens systems, said optical element having a positive power and a prism function for deflecting a bundle of rays transmitted through said first projection lens system towards an optical axis of said second projection lens system to thereby couple pupils of said first and second projection lens systems,
- wherein a diameter of a circle of confusion of said intermediate image on said decentered Fresnel optical element is larger than a Fresnel pitch of said decentered Fresnel optical element.

9. A pupil conjugate-coupling device in a projecting optical system comprising:
- a first projection lens system which forms an intermediate image of an image indicating element,
- a second projection lens system which projects said intermediate image onto a screen,
- said first and second projection lens systems having optical axes intersecting at a predetermined angle, and,
- an optical element having structural periodicity positioned between said first and second projection lens systems, said optical element having a positive power and a prism function for deflecting a bundle of rays transmitted through said first projection lens system towards an optical axis of said second projection lens system to thereby couple pupils of said first and second projection lens systems,
- wherein said optical element having structural periodicity is comprised of a diffusive optical element.

10. A pupil conjugate-coupling device according to claim 9, wherein said diffusive optical element is entirely made of a diffusion material.

11. A pupil conjugate-coupling device according to claim 10, wherein said intermediate image is formed within said diffusive optical element.

12. A pupil conjugate-coupling device according to claim 9, wherein said diffusive optical element is comprised of a pair of decentered Fresnel lenses having Fresnel surfaces and flat surfaces at which said decentered Fresnel lenses are adhered.

13. A pupil conjugate-coupling device according to claim 9, wherein said diffusive optical element is a decentered Fresnel lens having a Fresnel surface and a diffusion surface opposite thereto.

14. A pupil conjugate-coupling device according to claim 13, wherein said intermediate image is formed on said diffusion surface of said decentered Fresnel lens.

15. A pupil conjugate-coupling device according to claim 9, wherein said diffusive optical element is comprised of a pair of decentered Fresnel lenses having Fresnel surfaces and diffusion surfaces at which said decentered Fresnel lenses are adhered.

16. A pupil conjugate-coupling device according to claim 9, wherein said diffusive optical element is comprised of a decentered Fresnel lens having a Fresnel surface and a diffusion surface opposite thereto, and a decentered Fresnel lens made of a diffusion material having a Fresnel surface and a flat surface.

17. A pupil conjugate-coupling device according to claim 9, wherein an extension plane of said screen of said second projection lens system, a plane passing through a principal point of said first projection lens and perpendicular to said optical axis, and an extension plane of said intermediate image intersect on a straight line, and wherein an extension plane of said screen of said second projection lens system, a plane passing through a principal point of said first projection lens and perpendicular to said optical axis, and an extension plane of said intermediate image intersect on a straight line.

18. A pupil conjugate-coupling device according to claim 9, wherein said intermediate image includes a trapezoidal distortion and an image projected onto said screen includes no trapezoidal distortion.

19. A pupil conjugate-coupling device in a projecting optical system comprising:
- a first projection lens system which forms an intermediate image of an image indicating element,
- a second projection lens system which projects said intermediate image onto a screen,
- said first and second projection lens systems having optical axes intersecting at a predetermined angle,
- an optical element having structural periodicity positioned between said first and second projection lens systems, said optical element having a positive power and a prism function for deflecting a bundle of rays transmitted through said first projection lens system towards an optical axis of said second projection lens system to thereby couple pupils of said first and second projection lens systems, and,
- an optical element oscillating means for oscillating said optical element having structural periodicity in a direction intersecting said optical axis.

20. A pupil conjugate-coupling device according to claim 19, wherein an amplitude and cycle of said oscillation of said optical element caused by said optical element oscillating means are determined such that said periodic structure of said optical element projected onto said screen is made inconspicuous.

21. A pupil conjugate-coupling device according to claim 19, wherein a cycle of said oscillation is greater than 30 cycles.

22. A pupil conjugate-coupling device according to claim 19, wherein an extension plane of said screen of said second projection lens system, a plane passing through a principal point of said projection lens and perpendicular to said optical axis, and an extension plane of said intermediate image intersect on a straight line, and wherein an extension plane of said screen of said second projection lens system, a plane passing through a principal point of said projection lens and perpendicular to said optical axis, and an extension plane of said intermediate image intersect on a straight line.

23. A pupil conjugate-coupling device according to claim 19, wherein said intermediate image includes a trapezoidal distortion and an image projected onto said screen includes no trapezoidal distortion.

24. A pupil conjugate-coupling device in a projecting optical system comprising:
a first projection lens system which forms an intermediate image of an image indicating element,
a second projection lens system which projects said intermediate image onto a screen,
said first and second projection lens systems having optical axes intersecting at a predetermined angle,
an optical element having structural periodicity positioned between said first and second projection lens systems, said optical element having a positive power and a prism function for deflecting a bundle of rays transmitted through said first projection lens system towards an optical axis of said second projection lens system to thereby couple pupils of said first and second projection lens systems, and,
an optical element rotating means for rotating said optical element having structural periodicity, so that said structural periodicity is varied with respect to said optical axis.

25. A pupil conjugate-coupling device according to claim 24, wherein said optical element having structural periodicity comprises a decentered Fresnel optical element having a group of concentric prisms, and wherein a center of rotation of said optical element is offset from a center of said Fresnel fringes.

26. A pupil conjugate-coupling device according to claim 24, wherein said optical element having structural periodicity comprises a decentered Fresnel optical element having a spiral prism originating in a vicinity of a center of rotation of said optical element and extending to a circumference of said optical element.

27. A pupil conjugate-coupling device according to claim 24, wherein said optical element having structural periodicity comprises a decentered Fresnel optical element having a plurality of split sector areas about a center of rotation, said sector areas being provided with prisms having pitches and phases, at least one of which is different.

28. A pupil conjugate-coupling device according to claim 27, wherein said sector areas have different sizes.

29. A pupil conjugate-coupling device according to claim 24, further comprising an oscillating means to which said optical element is connected to oscillate said optical element in a direction intersecting said optical axis.

30. A pupil conjugate-coupling device according to claim 24, wherein an extension plane of said screen of said second projection lens system, a plane passing through a principal point of said projection lens and perpendicular to said optical axis, and an extension plane of said intermediate image intersect on a straight line, and wherein an extension plane of said screen of said second projection lens system, a plane passing through a principal point of said projection lens and perpendicular to said optical axis, and an extension plane of said intermediate image intersect on a straight line.

31. A pupil conjugate-coupling device according to claim 24, wherein said intermediate image includes a trapezoidal distortion and an image projected onto said screen includes no trapezoidal distortion.

32. A pupil conjugate-coupling device in a projecting optical system comprising:
a first projection lens system which forms an intermediate image of an image indicating element,
a second projection lens system which projects said intermediate image onto a screen,
said first and second projection lens systems having optical axes intersecting at a predetermined angle, and,
a pupil conjugate-coupling optical element positioned between said first and second projection lens systems, said optical element having a positive power and a prism function to deflect a bundle of rays transmitted through said first projection lens system towards said optical axis of said second projection lens system to thereby couple pupils of said first and second projection lens systems, said optical element being comprised of a hologram,
wherein said hologram is deviated from an intermediate image forming position by a predetermined offset in an optical axis direction thereof.

33. A pupil conjugate-coupling device according to claim 32, wherein an extension plane of said image indicating element surface of said first projection lens system, a plane passing through a principal point of said projection lens and perpendicular to said optical axis, and an extension plane of said intermediate image intersect on a straight line, and wherein an extension plane of said screen of said second projection lens system, a plane passing through a principal point of said projection lens and perpendicular to said optical axis, and an extension plane of said intermediate image intersect on a straight line.

34. A pupil conjugate-coupling device according to claim 32, wherein said intermediate image includes a trapezoidal distortion and an image projected onto said screen includes no trapezoidal distortion.

35. A pupil conjugate-coupling device in a projecting optical system comprising:
a first projection lens system which forms an intermediate image of an image indicating element,
a second projection lens system which projects said intermediate image onto a screen,
said first and second projection lens systems having optical axes intersecting at a predetermined angle, and,
a pupil conjugate-coupling optical element positioned between said first and second projection lens systems, said optical element having a positive power and a prism function for deflecting a bundle of rays transmitted through said first projection lens system towards an optical axis of said second projection lens system to thereby couple pupils of said first and second projection lens systems,
wherein said optical element is comprised of a hologram, which is positioned at a location at which said intermediate image is formed, and a means for oscillating said hologram in a direction intersecting said optical axis.

36. A pupil conjugate-coupling device according to claim 35, wherein an amplitude and cycle of an oscillation of said hologram, effected by said hologram oscillating means, are determined such that an image of said hologram projected onto a screen is made inconspicuous.

37. A pupil conjugate-coupling device according to claim 35, wherein said cycle of oscillation is greater than 30 cycles.

38. A pupil conjugate-coupling device according to claim 35, wherein an extension plane of said image indicating element surface of said first projection lens system, a plane passing through a principal point of said projection lens and perpendicular to said optical axis, and an extension plane of said intermediate image intersect on a straight line, and wherein an extension plane of said screen of said second projection lens system, a plane passing through a principal point of said projection lens and perpendicular to said optical axis, and an extension plane of said intermediate image intersect on a straight line.

39. A pupil conjugate-coupling device according to claim 35, wherein said intermediate image includes a trapezoidal distortion and an image projected onto said screen includes no trapezoidal distortion.

* * * * *